United States Patent
Nakazawa et al.

(10) Patent No.: US 9,040,932 B2
(45) Date of Patent: *May 26, 2015

(54) SURFACE CONTAMINATION MONITORING SYSTEM AND METHOD

(71) Applicant: Canberra Industries, Inc., Meriden, CT (US)

(72) Inventors: Dante Nakazawa, West Haven, CT (US); James Zickefoose, Coventry, CT (US); Lloyd Cass, Toronto (CA); Gregory Bogorodzki, Richmond Hill (CA); Dominique Rothan, Aigremont (FR); Timothy Spillane, Quincy, MA (US)

(73) Assignee: CANBERRA INDUSTRIES, INC., Meriden, CT (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/676,781

(22) Filed: Nov. 14, 2012

(65) Prior Publication Data

US 2013/0313419 A1 Nov. 28, 2013

Related U.S. Application Data

(63) Continuation-in-part of application No. 13/297,379, filed on Nov. 16, 2011, now Pat. No. 8,748,838.

(51) Int. Cl.
- *G01T 1/02* (2006.01)
- *G01T 1/17* (2006.01)
- *G01T 3/00* (2006.01)
- *G01T 1/163* (2006.01)

(52) U.S. Cl.
CPC ... *G01T 1/17* (2013.01); *G01T 3/00* (2013.01); *G01T 1/163* (2013.01)

(58) Field of Classification Search
USPC ................................................. 250/390.03
See application file for complete search history.

(56) References Cited

U.S. PATENT DOCUMENTS 3,376,417 A * 4/1968 Keck et al. ............... 250/367
4,352,019 A * 9/1982 Pollard .................. 250/394

(Continued)

FOREIGN PATENT DOCUMENTS

JP 2006106010 A * 4/2006
WO WO 2010107383 A1 * 9/2010

OTHER PUBLICATIONS

Radiation Monitoring Systems, 2004, Fuji Electric Review, vol. 50, pp. 100-131.*

*Primary Examiner* — Christine Sung
(74) *Attorney, Agent, or Firm* — David W. Carstens; Kevin M. Klughart; Carstens & Cahoon, LLP

(57) ABSTRACT

A surface contamination monitoring system/method configured to correct the detected the radioactive net count rate (NCR) value of a whole-body surface contamination monitoring device based on monitored subject height and thickness is disclosed. The system includes a height detection means for determining the height of a monitored subject and a thickness detection means for determining the thickness of at least a portion of the monitored subject. The net count rate (NCR) is corrected based on the determined height and thickness of the monitored subject as applied to site calibration factor data and self-shielding factor data to produce a corrected net count rate (CNR). If the corrected net count rate (CNR) registers above a preset alarm threshold, the monitored subject is considered contaminated and an appropriate alarm is registered.

25 Claims, 24 Drawing Sheets

(56) References Cited

U.S. PATENT DOCUMENTS

| | | | |
|---|---|---|---|
| 4,591,720 A * | 5/1986 | Fuji et al. | 250/362 |
| 4,731,536 A * | 3/1988 | Rische et al. | 250/394 |
| 5,939,723 A * | 8/1999 | Keck | 250/363.01 |
| 2012/0161265 A1 * | 6/2012 | Hora et al. | 257/429 |
| 2012/0176246 A1 * | 7/2012 | Yanagishima et al. | 340/600 |

* cited by examiner

Default Gamma Detector Values for Position 1/2

| Zone (i) | $\beta$ | $a_i$ | $b_{i2}$ | $c_{i2}$ | $d_i$ | $w_i$ | $h_{i0}$ | Detector center above floor pan |
|---|---|---|---|---|---|---|---|---|
| | | $cm^{-1}$ | $cm^{-1}$ | $cm^{-2}$ | $cm^{-1}$ | | cm | cm |
| 27 | 1.000 | 0.33 | 6.13E-07 | 4.27E-05 | 1.47E-03 | 0.7 | 147.4 | 166.04 (136.83 – 195.25) |
| 28 | 0.996 | 0.12 | 2.43E-03 | 1.77E-07 | 4.95E-04 | 0.7 | 0 | 106.74 (77.53 – 135.95) |
| 29 | 0.998 | 0.76 | 5.96E-04 | 1.18E-07 | 2.28E-04 | 0.7 | 0 | 47.44 (18.23 – 76.65) |

$(h-h_0)$ is allowed to be negative.

Default PGB Detector Values for Position 1/2

| Zone (i) | $\beta$ | $a_i$ cm$^{-1}$ | $b_i$ cm$^{-1}$ | $c_i$ cm$^{-2}$ | $d_i$ cm$^{-1}$ | $w_i$ | $h_{0i}$ cm | Detector center above floor pan cm |
|---|---|---|---|---|---|---|---|---|
| 3 | 1 | 0.12 | 1.18E-03 | 0 | -1.85E-05 | 0.7 | 0 | 35.44 (17.34 – 53.54) |
| 4 | 1 | 0.12 | -9.55E-04 | 0 | 5.77E-04 | 0.7 | 0 | |
| 5 | 1 | 0.12 | 3.81E-04 | 0 | 2.78E-04 | 0.7 | 0 | |
| 6 | 1 | 0.12 | 4.66E-03 | -3.13E-05 | 7.71E-04 | 0.7 | 0 | 73.04 (54.94 – 91.14) |
| 7 | 1 | 0.12 | 1.94E-03 | -8.10E-06 | 4.71E-04 | 0.7 | 0 | |
| 8 | 1 | 0.12 | 3.70E-03 | -1.71E-05 | 3.47E-04 | 0.7 | 0 | |
| 9 | 1 | 0.12 | 3.16E-03 | -2.13E-05 | 4.91E-04 | 0.7 | 160 | 110.64 (92.54 – 128.74) |
| 10 | 1 | 0.12 | 4.12E-03 | 1.87E-04 | -7.25E-03 | 0.7 | 160 | |
| 11 | 1 | 0.12 | 3.78E-03 | 1.24E-04 | -5.12E-03 | 0.7 | 160 | |
| 12 | 1 | 0.12 | 3.84E-03 | -2.22E-05 | 1.93E-03 | 0.7 | 210 | 148.24 (130.14 – 166.34) |
| 13 | 1 | 0.12 | 4.80E-03 | 2.67E-05 | 1.34E-03 | 0.7 | 210 | |
| 14 | 1 | 0.12 | 3.63E-03 | -7.19E-06 | 1.76E-03 | 0.7 | 210 | |
| 15 | 1 | 0.12 | 1.85E-03 | 9.64E-06 | 5.37E-04 | 0.7 | 210 | 185.84 (167.74 – 203.94) |
| 16 | 1 | 0.12 | 1.51E-03 | 6.01E-06 | 4.12E-04 | 0.7 | 210 | |
| 17 | 1 | 0.12 | 2.40E-03 | 5.91E-05 | -1.10E-03 | 0.7 | 210 | |
| 73 | 1 | 0.12 | 2.15E-03 | -1.23E-05 | 4.32E-04 | 0.7 | 0 | |
| 74 | 1 | 0.12 | 3.11E-03 | 1.53E-04 | -6.33E-03 | 0.7 | 160 | |
| 75 | 1 | 0.12 | 6.42E-03 | -5.30E-05 | 2.41E-03 | 0.7 | 160 | |
| 76 | 1 | 0.12 | 2.51E-03 | -3.38E-06 | 9.43E-04 | 0.7 | 210 | |

($h-h_0$) is allowed to be negative

Exemplary Anthropometric Correction Factors

| Position | Zone | Factor a | Factor b | Factor c | Factor d | Factor B | Factor h0 | Factor w |
|---|---|---|---|---|---|---|---|---|
| 1 | 3 | 0.12 | 0.00118 | 0 | -1.85E-05 | 1 | 0 | 0.7 |
| 1 | 4 | 0.12 | -0.00096 | 0 | 0.000577 | 1 | 0 | 0.7 |
| 1 | 5 | 0.12 | 0.000381 | 0 | 0.000278 | 1 | 0 | 0.7 |
| 1 | 6 | 0.12 | 0.00466 | -3.13E-05 | 0.000771 | 1 | 0 | 0.7 |
| 1 | 7 | 0.12 | 0.00194 | -8.10E-06 | 0.000471 | 1 | 0 | 0.7 |
| 1 | 8 | 0.12 | 0.0037 | -1.71E-05 | 0.000347 | 1 | 0 | 0.7 |
| 1 | 9 | 0.12 | 0.00316 | -2.13E-05 | 0.000491 | 1 | 160 | 0.7 |
| 1 | 10 | 0.12 | 0.00412 | 0.000187 | -0.00725 | 1 | 160 | 0.7 |
| 1 | 11 | 0.12 | 0.00378 | 0.000124 | -0.00512 | 1 | 160 | 0.7 |
| 1 | 12 | 0.12 | 0.00384 | -2.22E-05 | 0.00193 | 1 | 210 | 0.7 |
| 1 | 13 | 0.12 | 0.0048 | 2.67E-05 | 0.00134 | 1 | 210 | 0.7 |
| 1 | 14 | 0.12 | 0.00363 | -7.19E-06 | 0.00176 | 1 | 210 | 0.7 |
| 1 | 15 | 0.12 | 0.00185 | 9.64E-06 | 0.000537 | 1 | 210 | 0.7 |
| 1 | 16 | 0.12 | 0.00151 | 6.01E-06 | 0.000412 | 1 | 210 | 0.7 |
| 1 | 17 | 0.12 | 0.0024 | 5.91E-05 | -0.0011 | 1 | 210 | 0.7 |

Exemplary Anthropometric Correction Factors

| Position | Zone | Factor a | Factor b | Factor c | Factor d | Factor B | Factor h0 | Factor w |
|---|---|---|---|---|---|---|---|---|
| 1 | 73 | 0.12 | 0.00215 | -1.23E-05 | 0.000432 | 1 | 0 | 0.7 |
| 1 | 74 | 0.12 | 0.00311 | 0.000153 | -0.00633 | 1 | 160 | 0.7 |
| 1 | 75 | 0.12 | 0.00642 | -5.30E-05 | 0.00241 | 1 | 160 | 0.7 |
| 1 | 76 | 0.12 | 0.00251 | -3.38E-06 | 0.000943 | 1 | 210 | 0.7 |
| 2 | 3 | 0.12 | 0.00118 | 0 | -1.85E-05 | 1 | 0 | 0.7 |
| 2 | 4 | 0.12 | -0.00096 | 0 | 0.000577 | 1 | 0 | 0.7 |
| 2 | 5 | 0.12 | 0.000361 | 0 | 0.000278 | 1 | 0 | 0.7 |
| 2 | 6 | 0.12 | 0.00466 | -3.13E-05 | 0.000771 | 1 | 0 | 0.7 |
| 2 | 7 | 0.12 | 0.00194 | -8.10E-06 | 0.000471 | 1 | 0 | 0.7 |
| 2 | 8 | 0.12 | 0.0037 | -1.71E-05 | 0.000347 | 1 | 0 | 0.7 |
| 2 | 9 | 0.12 | 0.00316 | -2.13E-05 | 0.000491 | 1 | 160 | 0.7 |
| 2 | 10 | 0.12 | 0.00412 | 0.000187 | -0.00725 | 1 | 160 | 0.7 |
| 2 | 11 | 0.12 | 0.00378 | 0.000124 | -0.00512 | 1 | 160 | 0.7 |
| 2 | 12 | 0.12 | 0.00384 | -2.22E-05 | 0.00193 | 1 | 210 | 0.7 |
| 2 | 13 | 0.12 | 0.0046 | 2.67E-05 | 0.00134 | 1 | 210 | 0.7 |
| 2 | 14 | 0.12 | 0.00363 | -7.19E-06 | 0.00176 | 1 | 210 | 0.7 |
| 2 | 15 | 0.12 | 0.00185 | 9.64E-06 | 0.000537 | 1 | 210 | 0.7 |
| 2 | 16 | 0.12 | 0.00151 | 6.01E-06 | 0.000412 | 1 | 210 | 0.7 |
| 2 | 17 | 0.12 | 0.0024 | 5.91E-05 | -0.0011 | 1 | 210 | 0.7 |
| 2 | 73 | 0.12 | 0.00215 | -1.23E-05 | 0.000432 | 1 | 0 | 0.7 |
| 2 | 74 | 0.12 | 0.00311 | 0.000153 | -0.00633 | 1 | 160 | 0.7 |
| 2 | 75 | 0.12 | 0.00642 | -5.30E-05 | 0.00241 | 1 | 160 | 0.7 |
| 2 | 76 | 0.12 | 0.00251 | -3.38E-06 | 0.000943 | 1 | 210 | 0.7 |

FIG. 20

Exemplary Report - Optimized Self-Shielding Factors For Gamma Detectors In Position 1

Optimize Self Shield (Gamma)

| Zone | Description | Unshielded Rate cps | Shielded Rate cps | Self Shield Factor | Fcal Factor |
|---|---|---|---|---|---|
| 70 | 24 Head | 101.3 | 99.09 | 0.976 | 0.04757 |
| 79 | 27 Body 1 | 700.7 | 698.4 | 0.997 | -0.005739 |
| 82 | 28 Body 2 | 696.7 | 699.4 | 1.001 | 0.06274 |
| 85 | 29 Body 3 | 700.5 | 697.8 | 0.996 | |
| 205 | 27-28 | 1399 | 1398 | 0.999 | |
| 206 | 28-29 | 1399 | 1397 | 0.999 | |
| 208 | 27-28-29 | 2100 | 2095 | 0.998 | |

Alt+1 = Beta Alt+2 = Alpha
F1 = Collect Unshielded (Background)
F2 = Collect Shielded (Occupied)
Ctrl+F1 = Clear Unshielded
Ctrl+F2 = Clear Shielded
F4 = Set Unshielded to Average Background
F5 = Set Factory Default
Ctrl+F5 = Set All Factory Defaults
Ctrl+F7 = Recall Previous Settings
F8 = Apply Self Shield to Gamma Zones
F10 = Save Self Shield Results
▲,◄,►,▼ ,Enter = Select Item
+,- = Change Value
Ctrl +,- = Fast Change
Esc = Return to Additional Test Menu Self Shield Type
Unshielded Count Time 180 s
Shielded Count Time 100 s
Minimum Self Shield Factor 0.25
Maximum Self Shield Factor 1.13
Unshielded Collection 09:39:53 03-Jun-2011
Shielded Collection 09:47:08 03-Jun-2011
Height 170.00 cm
Thickness 35.00 cm Exemplary Report - Contamination Check Results

```
Position = 1, Extended Count = Yes
Count Time = 16.0000 s
Height = 170 cm
Thickness = 35 cm Gamma Results, K Alpha = 3.000, K Beta1 = 2.000, K Beta2 = 2.000
```

| Zone Description | Raw Counts | Live Seconds | Gross cps | Bkg cps | Self Shld | Net cps | UTP cps | Alarm Bq | Eff | Result |
|---|---|---|---|---|---|---|---|---|---|---|
| 70  24 Head       | 1557   | 15.9938 | 97.35  | 100.1 | 0.976 | 0      | 131.0 | 2775.0 | 0.0500 | Clean |
| 79  27 Body 1     | 11147  | 15.9554 | 698.6  | 700.8 | 0.997 | 0.0502 | 151.5 | 2775.0 | 0.0600 | Clean |
| 82  28 Body 2     | 11236  | 15.9551 | 704.2  | 700.3 | 1.001 | 3.302  | 151.5 | 2775.0 | 0.0600 | Clean |
| 85  29 Body 3     | 11264  | 15.9549 | 706.0  | 701.2 | 0.996 | 7.407  | 151.5 | 2775.0 | 0.0600 | Clean |
| 205 27-28         | 22447  | 16.0000 | 1403   | 1401  | 0.999 | 3.402  | 176.0 | 2775.0 | 0.0708 | Clean |
| 206 28-29         | 22564  | 16.0000 | 1410   | 1402  | 0.999 | 10.71  | 176.0 | 2775.0 | 0.0708 | Clean |
| 209 27-28-29      | 33743  | 16.0000 | 2109   | 2102  | 0.998 | 10.79  | 225.0 | 2775.0 | 0.0900 | Clean |

2100

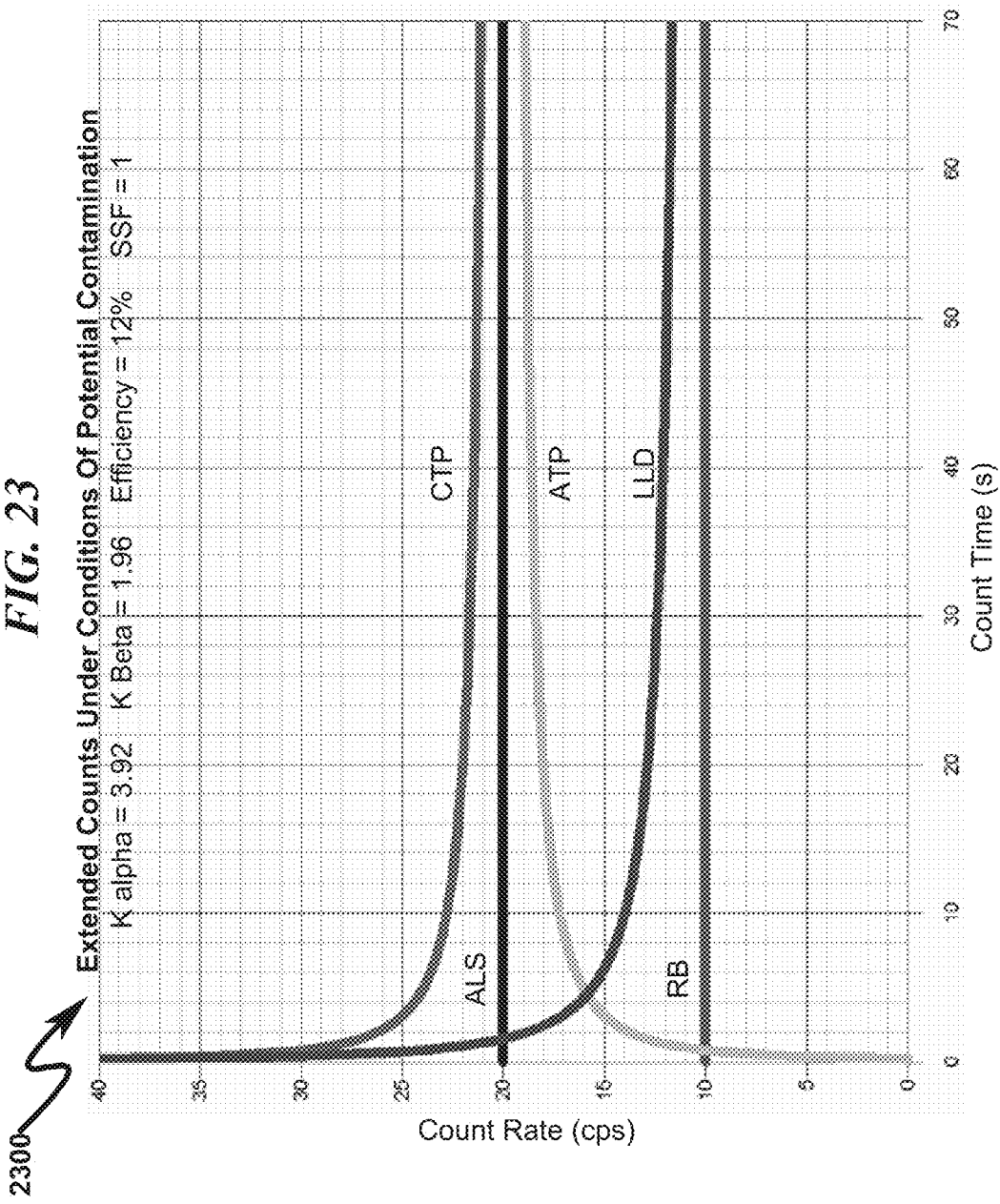

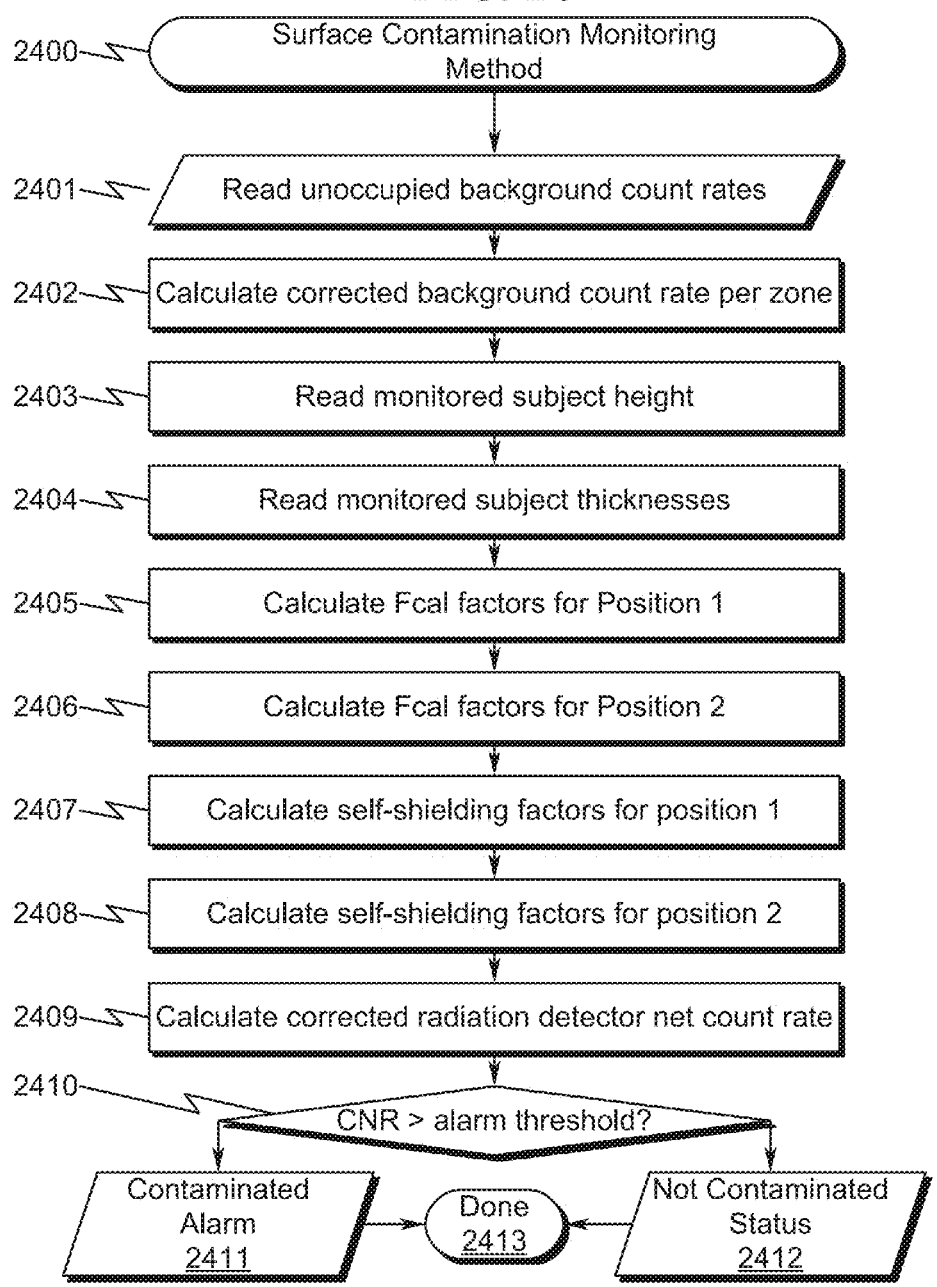

SURFACE CONTAMINATION MONITORING SYSTEM AND METHOD

CROSS REFERENCE TO RELATED APPLICATIONS

This application claims benefit under 35 U.S.C. §120 and incorporates by reference United States Utility Patent Application for BODY SELF-SHIELDING BACKGROUND COMPENSATION FOR CONTAMINATION MONITORS BASED ON ANTHROPOMETRICS by inventors Dante Nakazawa, James Zickefoose, Lloyd Cass, Gregory Bogorodzki, Dominique Rothan, and Timothy Spillane, filed electronically with the USPTO on Nov. 16, 2011, with Ser. No. 13/297,379, EFS ID 11417655, confirmation number 6002.

For the purposes of any United States Patent Filing, this application may be considered a Continuation-In-Part (CIP) application and claims benefit under 35 U.S.C. §120 and incorporates by reference United States Utility Patent Application for BODY SELF-SHIELDING BACKGROUND COMPENSATION FOR CONTAMINATION MONITORS BASED ON ANTHROPOMETRICS by inventors Dante Nakazawa, James Zickefoose, Lloyd Cass, Gregory Bogorodzki, Dominique Rothan, and Timothy Spillane, filed electronically with the USPTO on Nov. 16, 2011, with Ser. No. 13/297,379, EFS ID 11417655, confirmation number 6002.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for radiation detection in applications of surface contamination monitoring. Without limitation, this may include systems/methods for improving the accuracy of radiation contamination monitors used to determine surface contamination on monitored subjects, such as in the application of whole-body contamination monitoring of the body of a worker in an industrial environment.

PRIOR ART AND BACKGROUND OF THE INVENTION

Overview (0100)

Given the potentially harmful physiological effects from exposure to radiation, it is important to regularly monitor radiation workers, and other workers with potential whole-body exposure to radioactive materials, to assess potential contamination that might be present on or within the worker's body. As generally depicted in FIG. 1 (0100), whole-body ionizing radiation-monitoring devices for use with monitored subjects (0101) have been developed to automate and to improve the efficiency and effectiveness of this monitoring process.

As generally depicted in FIG. 1 (0100), a typical prior art monitoring portal (0110) utilizes an array of radiation detectors (0111), a number of which detect gamma radiation. The array (0111) allows a monitored subject (radiation worker) (0101) to enter the device and stand with one side of the worker's body positioned before the detector array (0111). An arm, side leg, and hand monitoring array (0112) is also present in the depiction. As shown, the monitored subject (0101) is facing the detector array (0111), with their right hand and arm inserted in the array (0112). Detectors (0113) on the base of the monitoring portal (0110) detect contamination that may be present on the monitored subject's (0101) feet. Thus, the monitored subject's (0101) anterior surface, right arm, right outside leg, and feet are being monitored for surface contamination. Once this anterior surface monitoring is complete, the monitored subject (0101) turns with their posterior surface against the detector array (0111), with their left hand and arm inserted in the array (0112). Once the posterior surface of the monitored subject (0101) has been surveyed, the measurement data is processed by an automated computing device, which logs the measurements and signals a contamination alarm if necessary.

Calibration

On-site calibration of such detection devices is crucial to the accuracy of its radiation measurements. As is commonly understood, gamma-ray background radiation is always present at levels that vary from physical location to location. To compensate for this background radiation variability, an on-site calibration routine utilizing one or more monitored subjects (who are known not to be contaminated) is typically performed to determine the existing background radiation properties and their effects on occupant self-shielding. The predetermined calibration factors to calculate the effects caused by the fact that the monitored subject's body has a shielding effect on the detector array (0111) may not fully describe the self-shielding on-site.

When standing in front of the detector array (0111), the monitored subject's body (0101) will absorb and/or scatter a certain amount of the background gamma radiation. This causes the resulting measured radiation net count rate (NCR) value to be different than the actual count rate (ACR) present on the monitored subject's body, because the background radiation (though no longer being detected at the same rate as before the monitored subject entered the device) is still being deducted from the measured counts. Thus, the sensitivity and accuracy of the surface contamination monitoring device is negatively impacted by this effect.

Net Count Rate (NCR) Correction

A common method currently employed in an attempt to deal with this problem is to apply a single correction factor to the measurement that compensates for this whole-body shielding effect upon the detectors. Essentially, a group of monitored subjects who are known not to be contaminated is surveyed and an average "standard" monitored subject profile is obtained. This "standard" monitored subject profile is intended to compensate for the average shielding effect that a body has on the measured background radiation. Thus, a single correction factor is applied to the measured radiation net count rate determinations. While this is an improvement over previous methods of measured radiation count rate determinations, it still does not account for the effects of varying body shapes and sizes. For example, a monitored subject with a slight frame (less shielding than average) will experience a measured radiation net count rate (NCR) greater than the actual count rate (ACR) while a monitored subject with a heavier frame (more shielding than average) will experience a measured radiation net count rate (NCR) less than the actual count rate (ACR).

"Standard" Monitored Subject Correction

Moreover, the average "standard" monitored subject profile does not compensate for the effects that various body heights and thicknesses have on the sensitivity and accuracy of the various sections of the detector array. For example, to increase sensitivity in the detectors, various detectors within the array will be grouped together to form a larger effective scintillating volume. Therefore, a monitored subject that is shorter than average or that has a slight frame will leave certain detector groupings exposed to (or unshielded from) the background counts. Thus, while the average "standard" monitored subject profile compensation assumes that these certain detector groupings should be experiencing some shielding, the resulting net count rate (NCR) will be greater than actual. Conversely, a monitored subject that is much taller than average or that has a much heavier frame will provide more shielding than average in a greater number of detector groupings. Because shielding for this monitored subject is more than average, the resulting measured radiation net count rate (NCR) will be less than the actual count rate (ACR).

Further still, this average "standard" monitored subject profile does not account for varying thickness of individual monitored subjects. For example, a monitored subject with an athletic build (small waist and midsection (gut) area, but large upper body) will provide more shielding to portions of the detector array near the chest area as opposed to those near the waist area. Thus, the portions of the detector array near the chest area, in reality, require a different correction factor than those near the monitored subject's waist. This requirement is reversed in the situation with a monitored subject having an excessively large midsection and relatively small upper body. Accordingly, the current "one-size-fits-all" approach does not adequately compensate for varying monitored subject bodies.

Body Weight Correction

Still others have attempted to compensate for this shielding effect by considering the monitored subject's body weight in determining a correction factor. While this may give some indication as to the monitored subject's density, it is no more accurate because it fails to consider the overall density distribution. Different types of tissue (muscle, adipose, etc.) have different densities and elemental compositions, affecting their absorption and scattering properties. Again, a monitored subject with an athletic build may carry all of his or her weight in the chest region, yet would weigh the same as (or even more than) an obese monitored subject carrying all of his or her weight in the midsection (gut) area. Moreover, a 183 cm tall individual that weighs 80 kg will have a different density distribution than a 152 cm tall individual of the same weight. Again, the same poorly-corrected-for shielding problems occur. What is needed is a more accurate method of correcting for the self-shielding effect that varying body sizes have upon whole-body detector arrays.

Deficiencies in the Prior Art

The prior art as detailed above suffers from the following deficiencies:
  Prior art surface contamination monitoring systems fail to accurately compensate NCR for environmental radiation factors.
  Prior art surface contamination monitoring systems fail to accurately compensate NCR variations in body size and height.
  Prior art surface contamination monitoring systems fail to accurately compensate NCR variations in body type and composition.
  Prior art surface contamination monitoring systems have no means to automatically incorporate variations in the measurement subject into the NCR compensation.
  Prior art surface contamination monitoring systems utilize "one size fits all" NCR compensation techniques which do not accurately produce ACR compensated values.
While some of the prior art may teach some solutions to several of these problems, the core issue of improving the accuracy of surface contamination monitoring systems has not been solved by the prior art.

OBJECTIVES OF THE INVENTION

Accordingly, the objectives of the present invention are (among others) to circumvent the deficiencies in the prior art and affect the following objectives in the context of a surface contamination monitoring system/method:
  (1) Provide for surface contamination monitoring system and method that automatically compensates NCR for self-shielding effects in the monitored subject.
  (2) Provide for surface contamination monitoring system and method that automatically compensates NCR for body variations in the monitored subject.
  (3) Provide for a surface contamination monitoring system and method that automatically determines the height and thickness of the monitored subject.
  (4) Provide for a surface contamination monitoring system and method that permits shielding of the monitored subject during the contamination monitoring evaluation.
  (5) Provide for a surface contamination monitoring system and method that permits the use of arrayed gamma ray detectors to perform monitored subject contamination detection.
  (6) Provide for a surface contamination monitoring system and method that permits radiation detectors within a radiation detector array to be combined to form summing zones that may be used to improve overall contamination monitoring accuracy.
  (7) Provide for a surface contamination monitoring system and method that permits monitored subject contamination examination without subject contact.
  (8) Provide for a surface contamination monitoring system and method that permits a more accurate determination of whether a monitored subject is in fact been radiation contaminated.
  (9) Provide for a surface contamination monitoring system and method that incorporates an arbitrary number of on-site calibrators to accurately characterize the local background and monitored subject (worker) population.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0200)

One embodiment disclosed herein is a whole-body surface contamination monitoring system, the system comprising:
(a) radiation detector array (0211); and
(b) computing device (0212);
wherein
the radiation detector array (0211) is configured to monitor radioisotope surface-contamination of a monitored subject (0201);
the computing device (0212) is configured to compute a corrected net count rate (CNR) (0215) based upon the net count rate (NCR) output of the radiation detector array (0211);
the CNR comprises a self-shielding correction factor;
the self-shielding correction factor comprises a height value and a thickness value (0214);
the height value represents a physical characteristic of the monitored subject (0201); and
the thickness value represents a physical characteristic of the monitored subject (0201).

Yet another exemplary system embodiment of the present invention comprises: a plurality of gamma radiation detectors, the detectors arranged in a detector array for radioisotope surface-contamination monitoring of at least a portion of the body of a monitored subject; and a computing device, the computing device operable to compute a net count rate (NCR) based upon the output of the gamma radiation detectors, wherein the net count rate (NCR) calculation includes a self-shielding correction factor that includes a height value and a thickness value, the height value and the thickness value representing physical characteristics of the monitored portion of the body of the monitored subject.

Method Overview (0300)

The present invention system may be utilized in the context of an overall surface contamination monitoring method as generally illustrated in FIG. 3 (0300), wherein the surface contamination monitoring system described previously is controlled by a method having the following steps:
(1) accepting outputs from a radiation detector array configured to monitor radioisotope surface-contamination of a monitored subject (0301);
(2) computing a corrected net count rate (CNR) based upon the net count rate (NCR) output of the radiation detector array (0302);
(3) determining if the CNR exceeds a predetermined alarm threshold (0303);
(4) if the alarm threshold has been exceeded, signaling a monitored subject contamination alarm (0304) and proceeding to step (6);
(5) otherwise signaling a monitored subject clean status (0305); and
(6) terminating the contamination monitoring method (0306);

wherein
the CNR comprises a self-shielding correction factor;
the self-shielding correction factor comprises a monitored subject height value and a monitored subject thickness value (0310);
the height value represents a physical characteristic of the monitored subject; and
the thickness value represents a physical characteristic of the monitored subject.

Integration of this and other preferred exemplary embodiment methods in conjunction with a variety of preferred exemplary embodiment systems described herein is anticipated by the overall scope of the present invention.

Another embodiment provides a computerized method of compensating for body self-shielding effects on background radiation counts during whole-body surface contamination monitor system operation, the method steps comprising: with at least one computing device: accepting the outputs from a plurality of gamma radiation detectors arranged in a detector array; accepting a height value and a thickness value, the height value and the thickness value each representing a physical characteristic of the monitored portion of the body of a monitored subject; calculating a self-shielding factor, the self-shielding factor including the height value and the thickness value; and calculating a net count rate (NCR), the net count rate (NCR) including the self-shielding factor calculation.

BRIEF DESCRIPTION OF THE DRAWINGS

For a fuller understanding of the advantages provided by the invention, reference should be made to the following detailed description together with the accompanying drawings wherein:

FIG. 17 illustrates exemplary default PGB detector values for positions 1 and 2;

FIG. 20 illustrates an exemplary optimized self-shielding factors for gamma detectors report;

FIG. 23 illustrates an exemplary graph of Extended Counts Under Conditions Of Potential Contamination and relates various parameters associated with alarm thresholds.

FIG. 24 illustrates an exemplary detailed method flowchart associated with some preferred embodiments of the present invention;

DESCRIPTION OF THE PRESENTLY PREFERRED EXEMPLARY EMBODIMENTS

Figure 1:
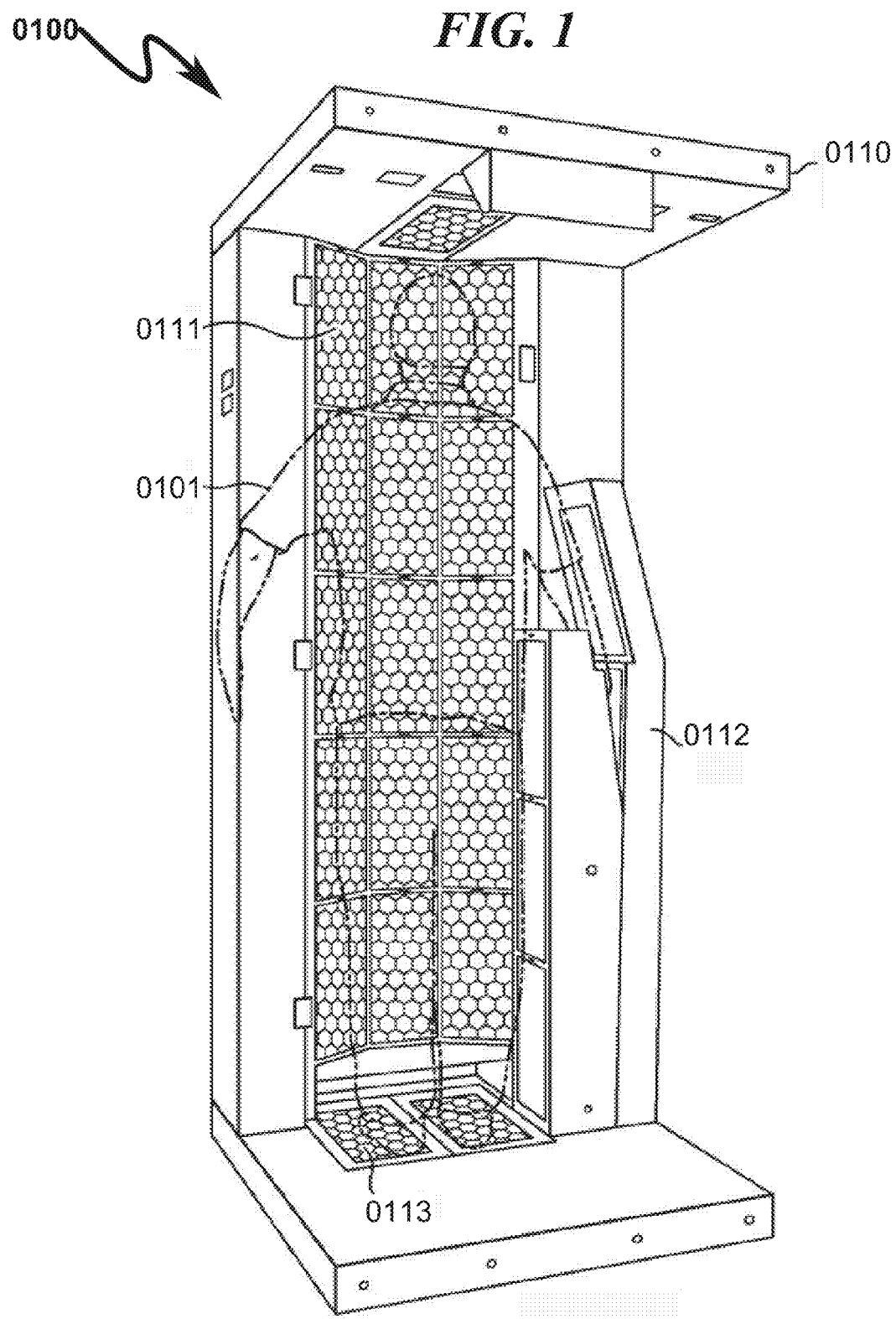
FIG. 1 illustrates a typical prior art whole-body surface contamination radiation monitoring device and depicts a monitored subject (radiation worker) standing therein.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a SURFACE CONTAMINATION MONITORING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Computing Device not Limitive

The present invention may make use of a wide variety of computing devices in its general theme of construction. As used herein "computing device" means any computer processing device capable of executing program instructions stored on a computer readable medium. While Personal Computer (PC) construction may be optimal in many circumstances, the present invention is not limited to this particular form of construction and the term "computing device" and "PC" should be given their broadest possible definitions in this context.

Height/Thickness Sensors not Limitive

While various preferred embodiments of the present invention presented herein may utilize a wide variety of photosensors and/or ultrasonic sensors and/or mechanical contact sensors for the determination of height and thickness values for a monitored subject, the present invention is not limited to these types of sensors for the determination of these values.

Sensor not Limitive

While various preferred embodiments of the present invention presented herein may utilize a wide variety of sensors for the determination of height and thickness values for a monitored subject, the term "sensor" or "sensor device" should be broadly construed to incorporate the use of video and still camera apparatus that may be used to perform equivalent orthogonal body height/thickness analysis of the monitored subject. Some exemplary sensors anticipated for use in various embodiments of the present invention include but are not limited to: photosensor; infrared reflectivity photosensor; time-of-flight photosensor; angular detection photosensor; multi-beam photosensor; orthogonal array photosensor; ultrasonic sensor; and mechanical contact sensor.

Radiation Type not Limitive

While the present invention may be advantageously applied to contexts in which gamma radiation is the object of detection by the surface contamination monitoring system/method, the present invention is not limited to this type of radiation detection.

Monitored Subject not Limitive

Within this document the term "monitored subject" will be generally used to describe an individual who is the subject of radiation monitoring within the context of a whole-body surface contamination monitoring system. This term should be deemed synonymous with a wide variety of other terms/phrases in this context (user, worker, radiation worker, etc.) to mean the object of the monitoring system/method. This term may also include the "body" of the monitored subject, although the term "monitored subject" shall be broadly construed to incorporate both the subject body and any clothing or other garments and as such should be broadly construed in this application context.

Whole-Body not Limitive

While the present invention may be advantageously applied in many application contexts to a whole-body surface contamination monitoring system/method, the present invention is not strictly limited to whole-body surface contamination monitoring, and may be applied to portions of the monitored subject.

System Overview (0200)

Figure 2:
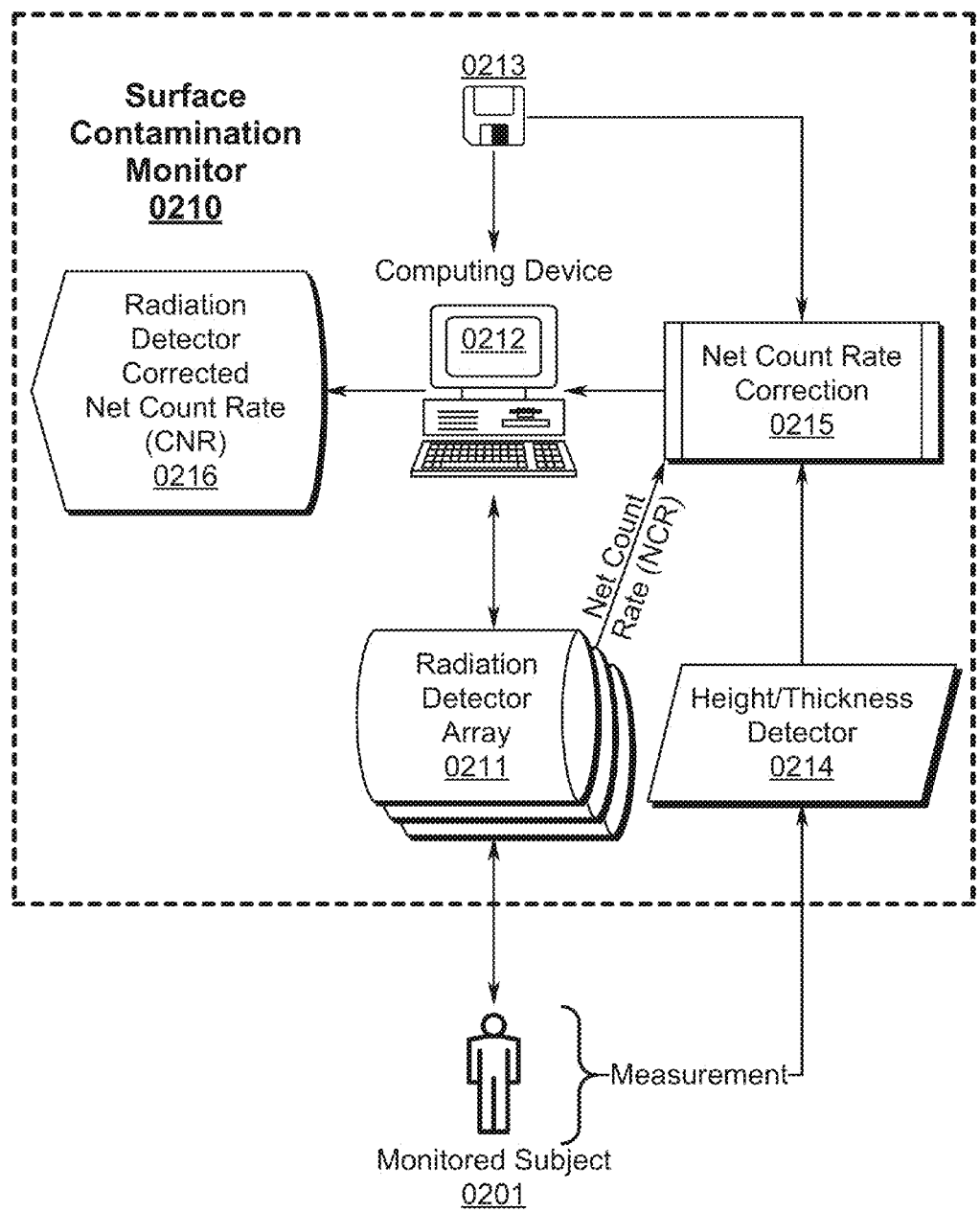
FIG. 2 illustrates a system block overview diagram describing a presently preferred embodiment of the present invention.

An overview of the present invention system is generally illustrated in FIG. 2 (0200) wherein a monitored subject (0201) is observed with a surface contamination monitoring system (0210) comprising a radiation detector array (0211) and a computing device (0212) (e.g., personal computer (PC) or other digital computerized calculating device) running under control of software read from a computer readable medium (0213). This computing device (0212) receives count rates from the radiation detector array (0211) configured to monitor surface radiation emitted from the monitored subject (0201). A mechanism for the detection of the height/thickness (0214) of the monitored subject (0201) is provided. This height/thickness information (0214) is utilized by net count rate (NCR) correction software (0215) operating under control of the computing device (0212) to generate a corrected radiation detector net count rate (CNR) display (0216) that compensates for the physical characteristics of the monitored subject (0201).

Method Overview (0300)

Figure 3:
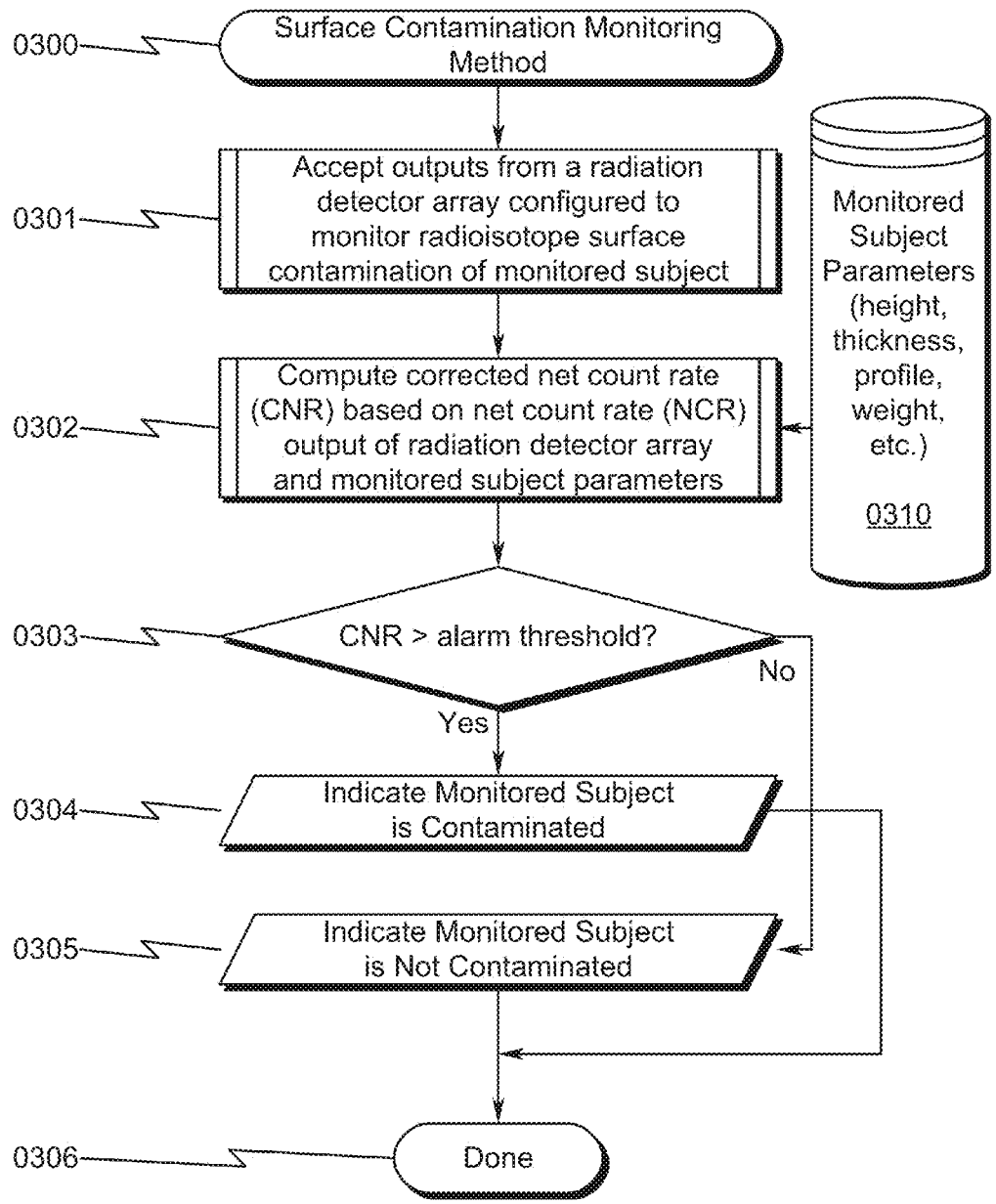
FIG. 3 illustrates an exemplary flowchart describing a presently preferred method embodiment.

An overview of the present invention surface contamination monitoring method is generally illustrated by the flowchart of FIG. 3 (0300). Here the method generally involves reading inputs from a radiation detector array (0301) before and during the presence of a monitored subject, followed by computation of a corrected net count rate (CNR) that is based on net count rate (NCR) measured of the radiation detectors (0302) in conjunction with measured background radiation and a variety of monitored subject parameters (0310) such as height, thickness, etc. Once the CNR has been calculated, it is compared to an alarm threshold (0303) to determine if the monitored subject is CONTAMINATED (0304) or NOT CONTAMINATED (0305). Within this methodology context, the alarm triggering decision (0303) may incorporate a variety of algorithms, and the measurement step (0301) may incorporate a wide variety of sensors and data acquisition procedures. The use of both stored site calibration factors as well as predefined site calibration factors in conjunction with site calibrators is anticipated as part of the monitored subject parameters (0310) that may be used in conjunction with this analysis.

Exemplary System Features

While the present invention may incorporate many features as described herein, several are thought of as optimal and are as follows:
  Standard features may include a color XVGA LCD display that indicate and prompt for monitoring procedures and proper positioning of the monitored subject, and for detected contamination, which detector is above the set alarm level. System setup (counting times, alarm levels or release limits, calibration, and high voltage and discriminator settings, etc.) may be accomplished through a PC alphanumeric keyboard/pointing device combo. Results of the automatic system self-diagnosis may be sent to a remote location.
  The software describe herein may detect changes in background during monitoring and force recount to avoid either false alarms or false negative results. Measurements in this context are typically fast and accurate, which is particularly important with changing backgrounds. An automatic high background warning and return to service feature may be incorporated, as well as automatic return to service following decontamination of a contaminated detector.
  Sensors placed strategically on the monitor sense the approach of a monitored subject, stop the current background update to eliminate any user-induced effect, establish the user's presence on the monitor platform (the "user" becomes the "occupant"), and senses the correct positioning of the monitored subject's body. Occupants may be clearly instructed about the monitoring sequence both by graphics on the display screen and by voice instruction.
  When personnel monitoring is completed, the occupant may receive one of three messages, both audibly and visually: "CLEAN", "CONTAMINATED", or "TURN" (for 2-step contamination monitoring only).
  If any alarm level has been exceeded, the "CONTAMINATED" message given at the completion of monitoring may also provide a display of all detectors, with alarming detectors shown in flashing red. The option of displaying Gross Rate, Net Rate or Net Activity for each alarming detector may also be made available. A red LED beside the alarming detector(s) may indicate the contaminated region.
  The contamination monitor may be equipped with an Ethernet connector for networking capability. Control software may use this feature to permit monitoring and displaying the operational status of multiple contamination monitor units on a Central Monitoring computer. Data files, which include configuration settings as well as calibration, maintenance and results files, may be sent to a network computer for archiving or for analysis. This file transfer operation may be done automatically at a preset time every day or when requested by a system operator. Automatic transfer of monitor status and history files to a central computer or network drive may also be configured.
  A Contamination Check Results report file can be created automatically after every monitoring cycle, including both positions for 2-Step monitors, during normal operation (occupant check), detector/zone contamination checks (contaminated results only), and alarm tests. The Contamination Check Results report provides all the raw data used in making a "Clean" or "Contaminated" decision, including detector counts and alarm trip points for every detection zone, including sum zones (pairs, triplets, quads and "All" as applicable). It can be used to facilitate a retrospective audit of "Clean" and "Contaminated" decisions.
  If Extended Counting Time was used in making the clean/contaminated decision, then a Pre-Extend Results file containing the results for the initial counting period may optionally be created.
  Following a user-contaminated decision, the monitor may perform a Detector Contamination Check (on page 74).
  All Contamination Check Results files may be automatically transferred to the central history computer or the mapped network drive.

One skilled in the art will recognize that these illustrated system features are only exemplary of those possible using the teachings of the present invention.

Height/Thickness Detection (0400)-(0800)

Overview
  The height/thickness detectors (0214) may be embodied in a wide variety of forms, including but not limited to the use of the following methodologies:
    photosensor;
    infrared reflectivity photosensor;
    time-of-flight photosensor;
    angular detection photosensor;
    multi-beam photosensor;

orthogonal (quadrature) array photosensor;
video/still camera CCD sensor;
ultrasonic sensor; and
mechanical contact sensor.

The present invention anticipates that the height and thickness measurements may be made using combinations of these technologies and that the height/thickness measurements may not necessarily use the same measurement technique.

Height Photosensors (0400)

Figure 4:
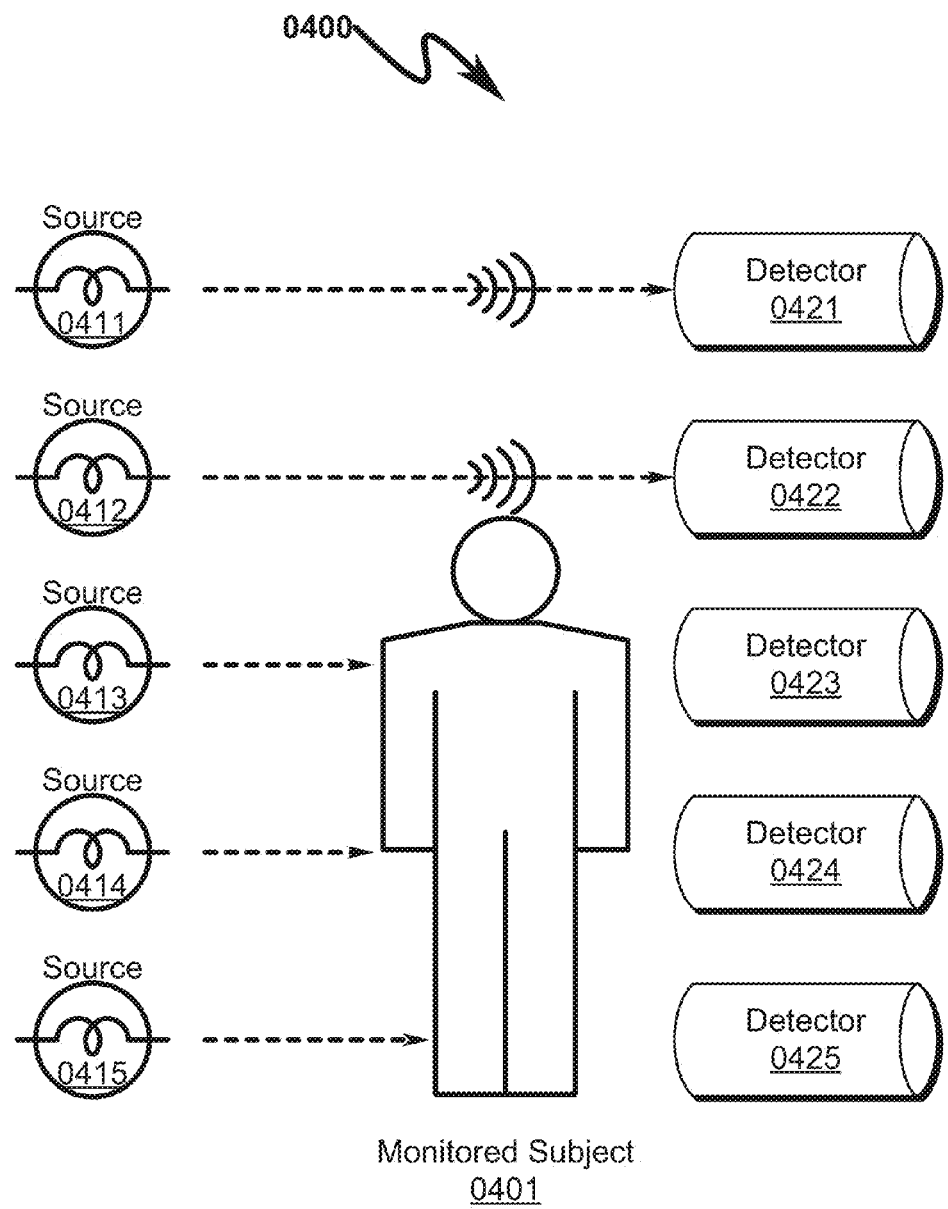
FIG. 4 illustrates an exemplary multi-beam photosensor height detection methodology useful in some preferred invention embodiments.

As generally depicted in FIG. 4 (0400), photosensors (0411, 0412, 0413, 0414, 0415) or similar sources may be used in conjunction with corresponding detectors (0421, 0422, 0423, 0424, 0425) to determine the height of the monitored subject (0401). This is just one anticipated methodology of determining the monitored subject (0401) height.

Orthogonal/Quadrature Thickness Measurements (0500, 0600)

Figure 5:
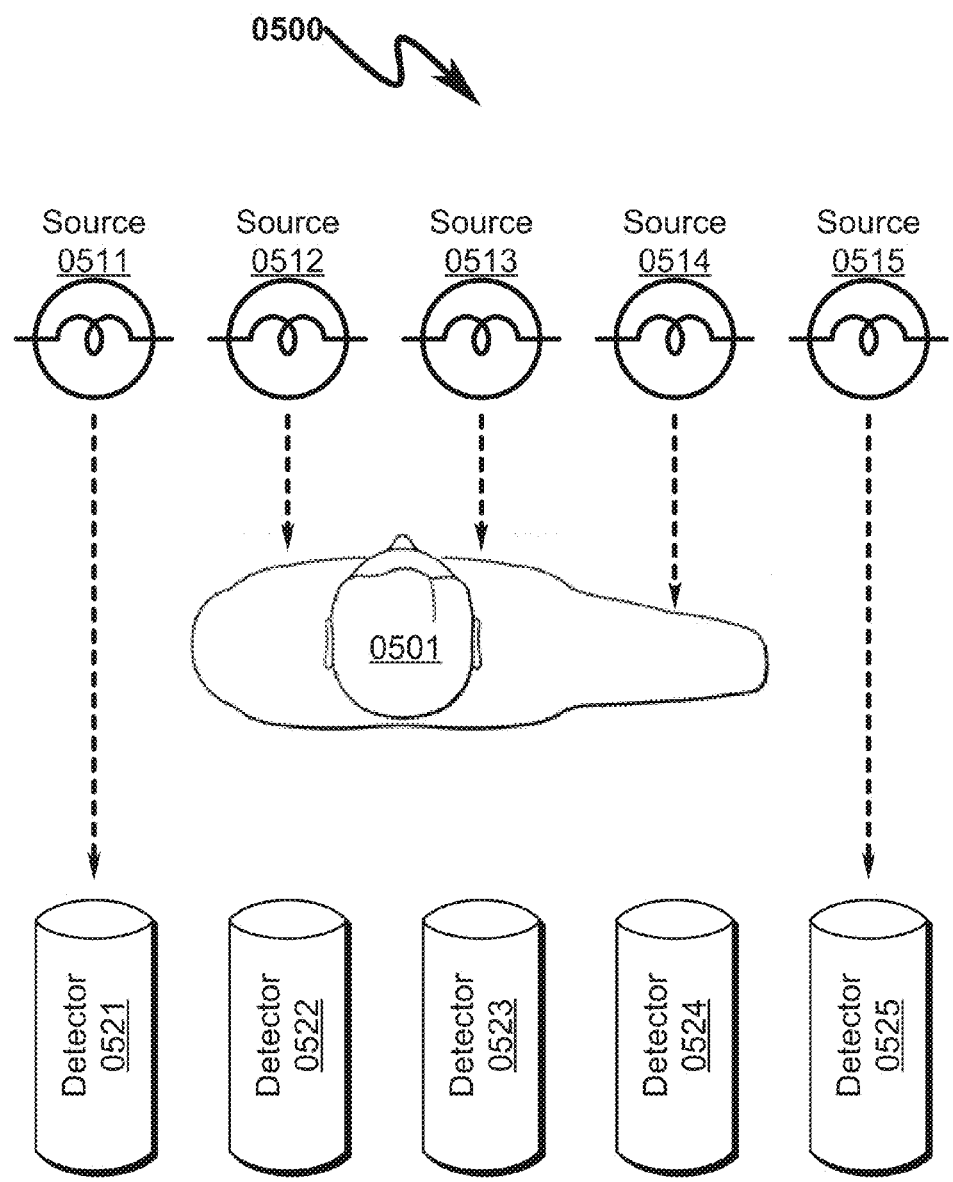
FIG. 5 illustrates an exemplary multi-beam orthogonal/quadrature photosensor thickness detection methodology useful in some preferred invention embodiments.
Figure 6:
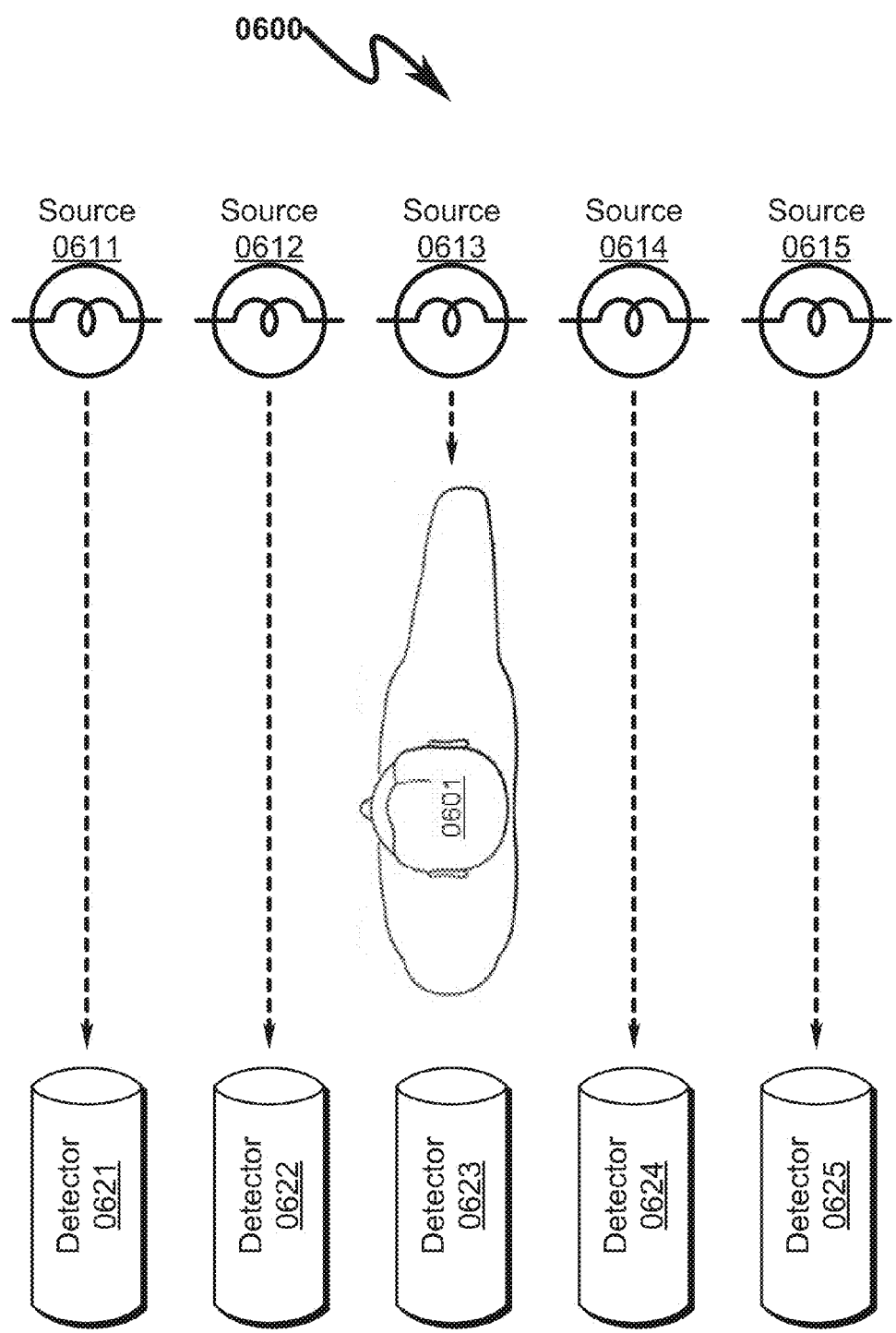
FIG. 6 illustrates an exemplary multi-beam orthogonal/quadrature photosensor thickness detection methodology useful in some preferred invention embodiments.

A similar technique to that used as depicted in FIG. 5 (0500) and FIG. 6 (0600) to implement thickness measurements using orthogonal thickness measurements. A series of source (0511, 0512, 0513, 0514, 0515) and detector (0521, 0522, 0523, 0524, 0525) pairs are first used to determine thickness measurements in one horizontal plane of the monitored subject (0501). Subsequent to this measurement, as depicted in FIG. 6 (0600), the monitored subject (0601) orientation is either changed (or equivalently an orthogonal set of sources (0611, 0612, 0613, 0614, 0615) and detectors (0621, 0622, 0623, 0624, 0625)) and a detection of the orthogonal thickness of the monitored subject (0601) is determined. A combination of both orthogonal thickness measurements will determine the overall two-dimensional area associated with a given horizontal plane of the monitored subject (0501, 0601), and thus can be used to determine the overall volume of the monitored subject (0501, 0601) based on a given vertical measurement. As generally discussed below, the sensor/detector methodologies used to implement this orthogonal/quadrature thickness measurement may vary based on application context.

Video/Camera Thickness Measurements—(0700, 0800)

Figure 7:
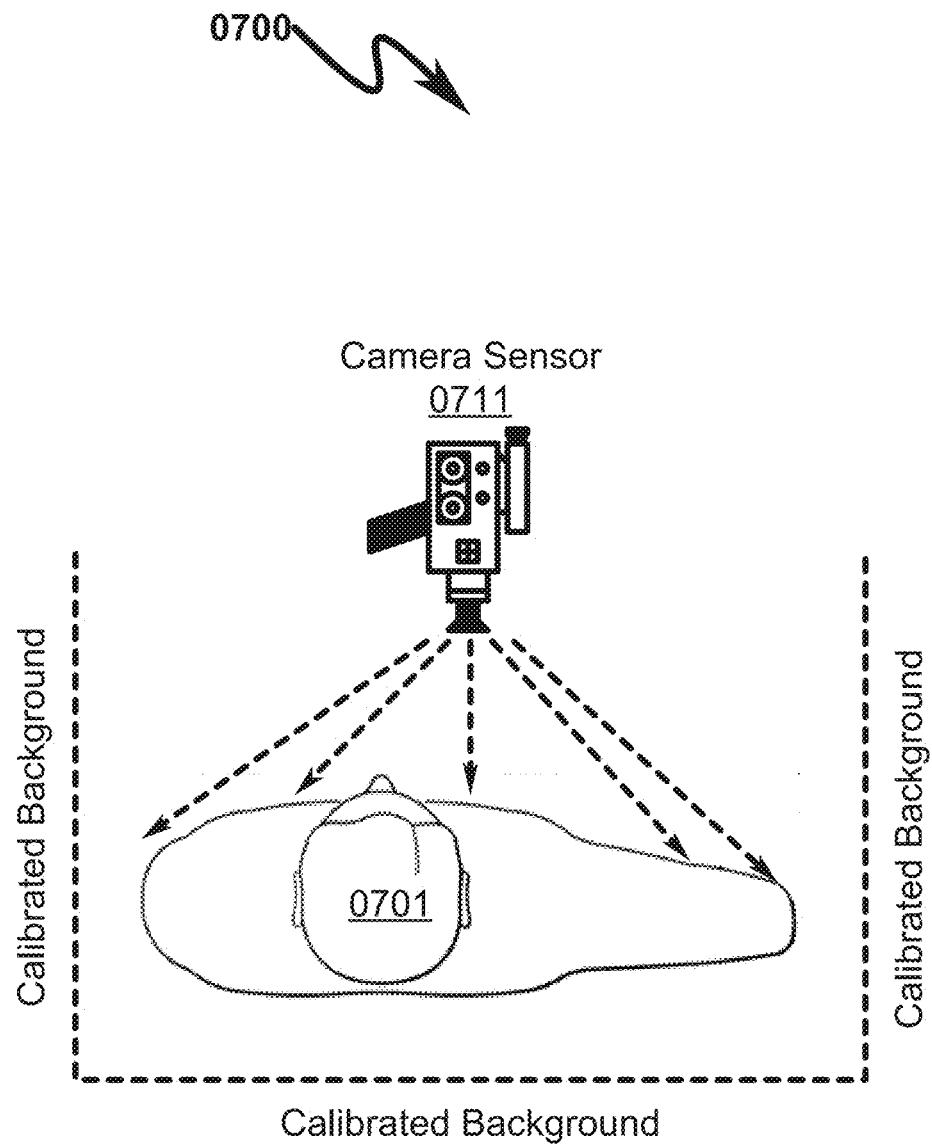
FIG. 7 illustrates an exemplary single-image orthogonal/quadrature video/camera thickness detection methodology useful in some preferred invention embodiments.
Figure 8:
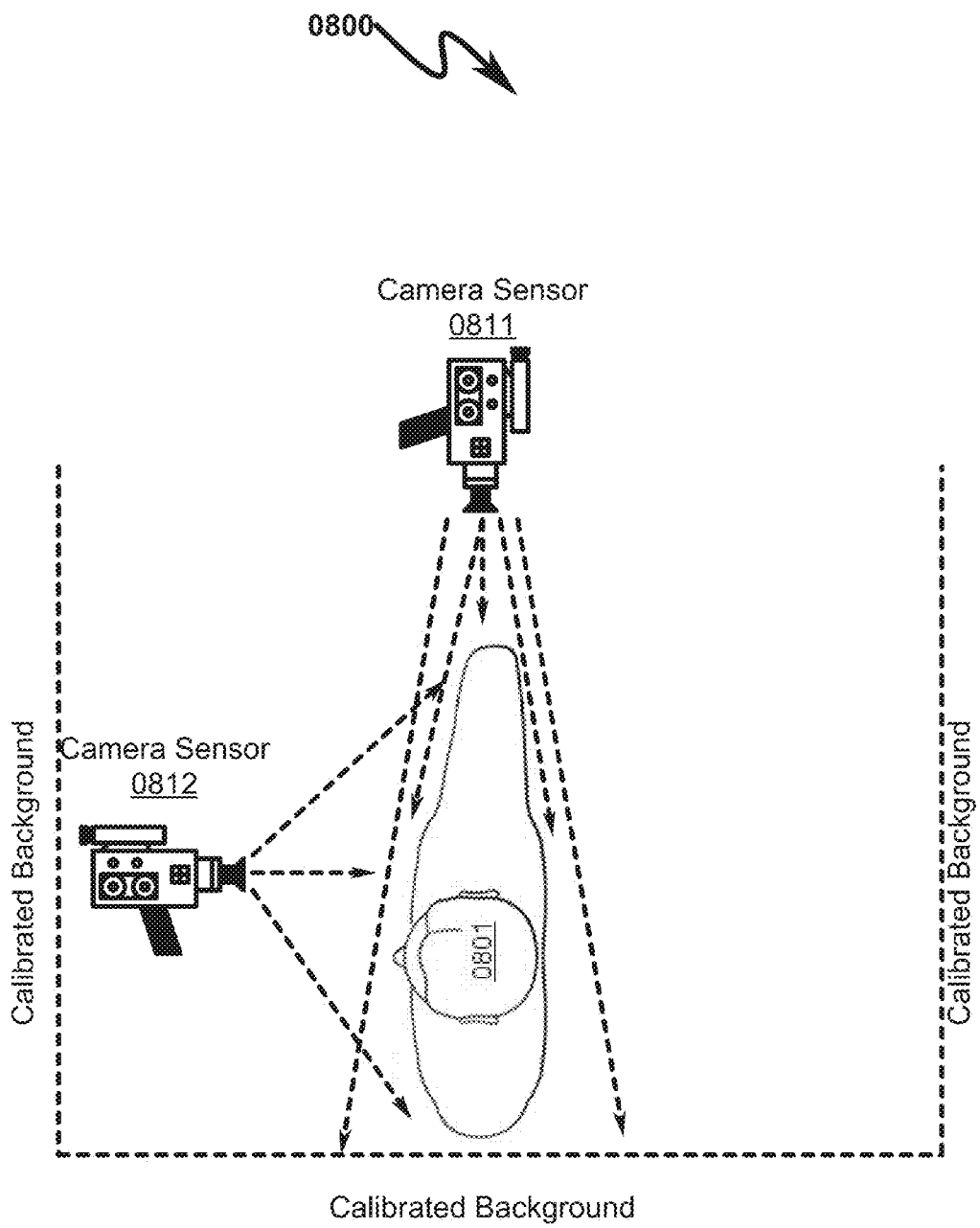
FIG. 8 illustrates an exemplary multi-image orthogonal/quadrature video/camera thickness detection methodology useful in some preferred invention embodiments.

The same orthogonal/quadrature thickness measurement technique detailed in FIG. 5 (0500)-FIG. 6 (0600) may be implemented using a single video/camera image capture device as generally illustrated in FIG. 7 (0700)-FIG. 8 (0800). As generally depicted in FIG. 7 (0700), in this scenario an image capture device (0711) captures an image of a monitored subject (0701) from one viewpoint against a calibrated background that enables the image capture device (0701) to properly gauge the width of the monitored subject (0701). As depicted in FIG. 8 (0800), an orthogonal/quadrature image (0811) may also be captured of the monitored subject (0801) to determine the depth of the monitored subject (0801). Combining these two pieces of information enables a calculation of the body volume of the monitored subject (0701, 0801) at different height levels and thus a profile of the monitored subject (0701, 0801) can be determined at various heights.

Figure 13:
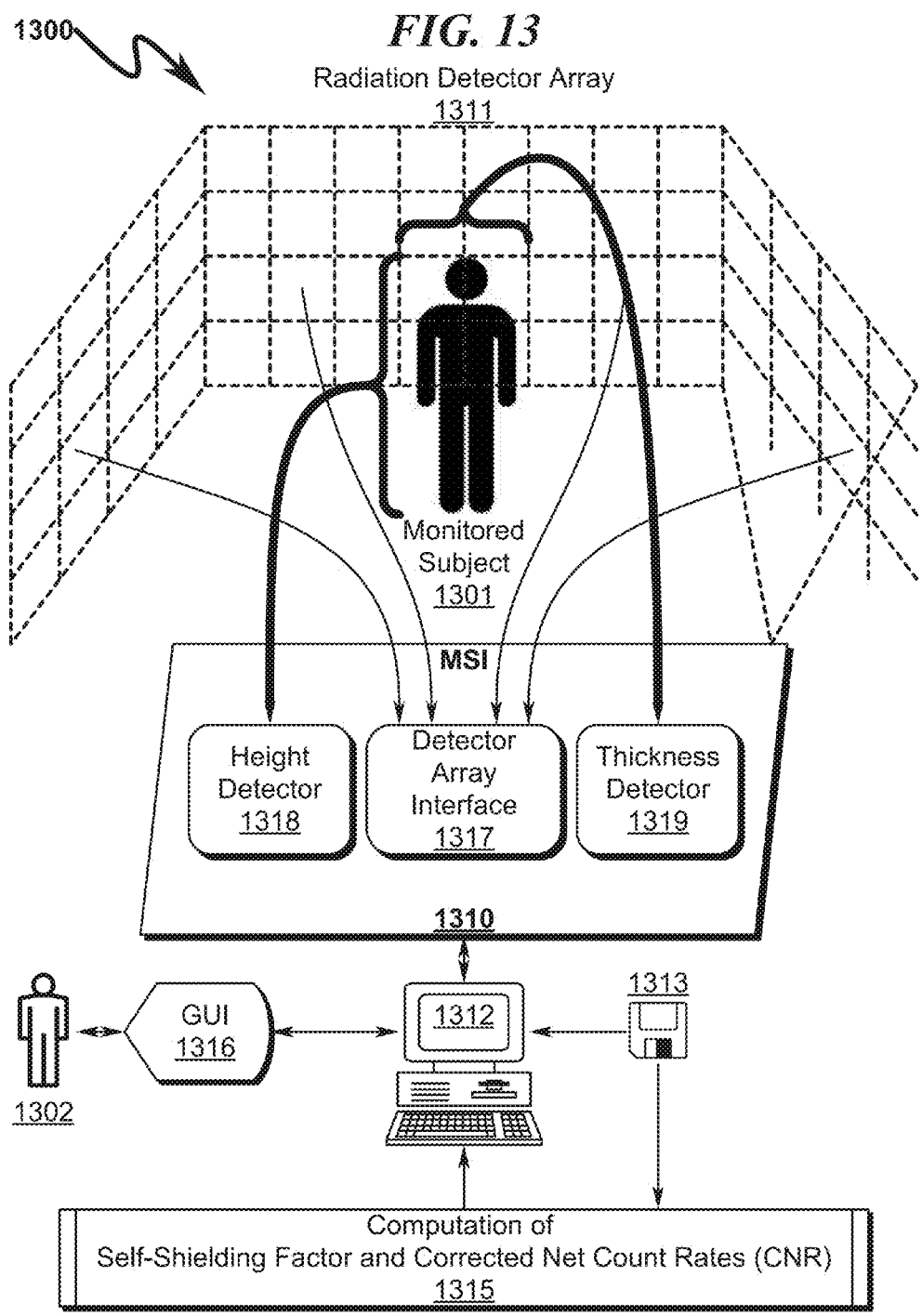
FIG. 13 illustrates a data flow diagram describing information flow within a presently preferred embodiment of the present invention.

The calibrated background in this example can take many forms, but in many preferred embodiments a regular pattern of rectangles or calibrated rulers as generally illustrated in FIG. 13 (1300) may be used.

Whole-Body Surface Contamination Monitoring (0900)

Figure 9:
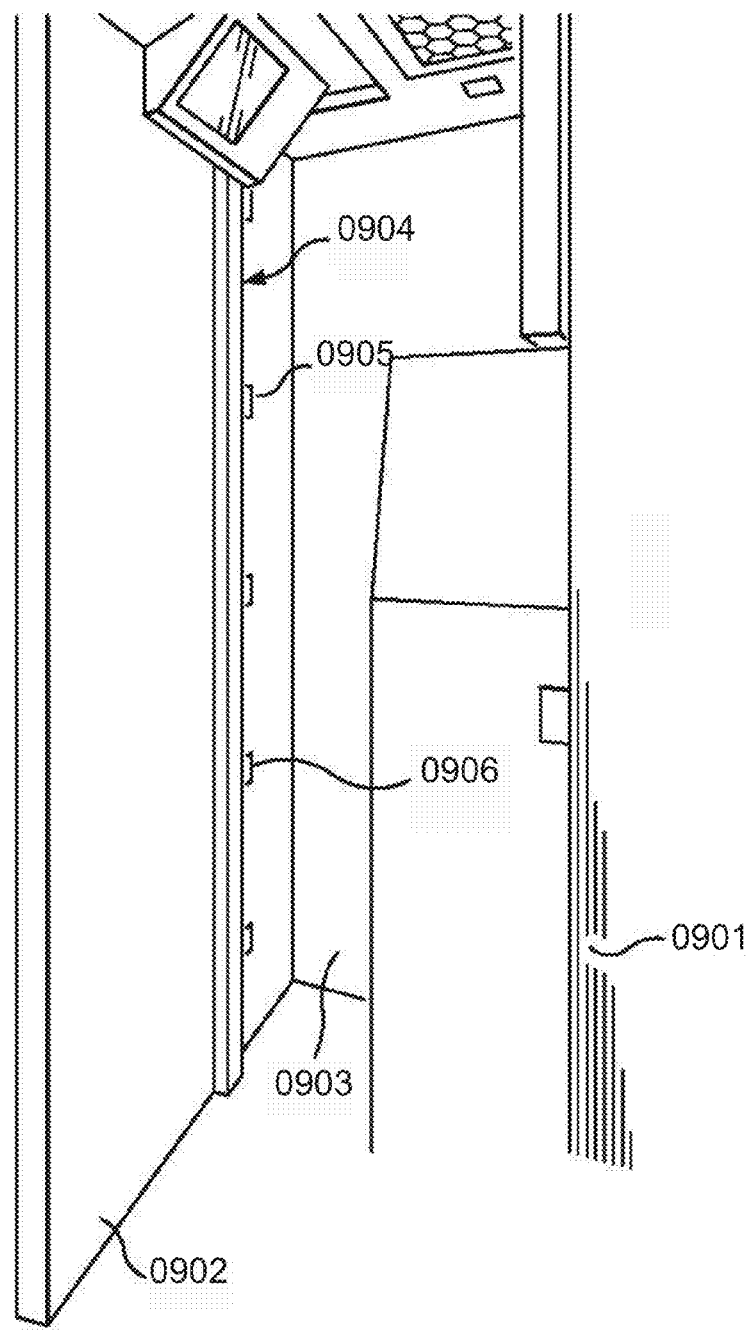
FIG. 9 illustrates a depiction of a portion of an preferred exemplary embodiment of the present invention, drawing the reader's attention to portions of an exemplary automatic thickness sensing device.

FIG. 9 (0900) depicts an exemplary embodiment of a whole-body surface contamination monitoring device (0901) incorporating the inventive aspects disclosed herein as they relate to the generalized system architecture taught in FIG. 2 (0200, 0210). As can be seen in FIG. 9 (0900), a vertical panel (0902) is added to enclose the area in which the monitored subject stands (0903) and to provide additional shielding from external radiation fields. This panel (0902) provides support for the overall device structure (0901) as well as the thickness sensor (0904).

Thickness Sensor

In a presently preferred exemplary embodiment as generally illustrated in FIG. 9 (0900), the thickness sensor (0904) utilizes photosensor device technology to determine the body thickness of the monitored subject without physically contacting the monitored subject. This can be accomplished in several ways, depending on the type of photosensor chosen. For example, a first embodiment employs an infrared reflectivity device wherein the photo-detector member measures the reflectivity of light emitted from the photo-emitter member. In such a sensor, the distance between the object being sensed and the photosensor will be determined by the amount of reflectivity. Other photosensors utilize time-of-flight detection, wherein the speed of light (a known constant) may be used to determine distance to an object based on the amount of time it takes for the emitted reflected beam to be detected by the photo-detector member. Still others utilize angular detection, wherein the return angle of the reflected light determines the distance between the photosensor and the detected object. In another embodiment, an ultrasonic distance detection device that utilizes time-of-flight determinations with reflected sound as opposed to light. One of ordinary skill in the art will understand and appreciate that the operational theory and control design of these and other similar distance determination means is well known in the industry and does not serve to limit the scope of the claims herein.

The thickness sensor (0904) is first calibrated without a monitored subject standing in the device (0901). This causes the thickness sensor (0904) control circuitry to return a value representing the distance from the sensor face to the detector array panels (FIG. 10 (1008)). When a monitored subject steps into the device (0901) to begin the monitoring process, they contact the radiation detector array (FIG. 10 (1008)) and the thickness sensor (0904) performs another measurement, returning a value representing the distance from the sensor face to the side of the monitored subject that is opposite the side contacting the detector array. Thus, by subtracting the value representing the distance to the monitored subject from the value representing the distance to the detector array, it is possible to approximate the thickness of the monitored subject.

In a presently preferred exemplary embodiment, a single thickness sensor (0904) is utilized at a point along the anteroposterior axis of a monitored subject of average height, slightly higher than the midpoint. In this position, the thickness sensor (0904) is exposed to the lower abdomen (or stomach area) of the monitored subject, which, on average, tends to be the thickest body portion. This thickness sensor may be fixed in a predetermined position within the device (0901), or may be moveable to allow the sensor to be placed in the optimum position for the given worker population that the device (0901) is intended to service. In another embodiment, an array of thickness sensors (0904, 0905, 0906) is utilized to determine thickness values at different points along the anteroposterior axis of the monitored subject. Thus, the system may utilize an average of these multiple thickness values in subsequent correction calculations, or may apply the measured thickness value to the correction calculations for measurements obtained at each respective area of the detector array. In yet another embodiment, a mechanical means may be utilized (for example, a tape measure or a caliper gauge) to determine the monitored subject's thickness, which may then be manually entered into the computing device.

Height Sensor (1000,1100)

Figure 10:
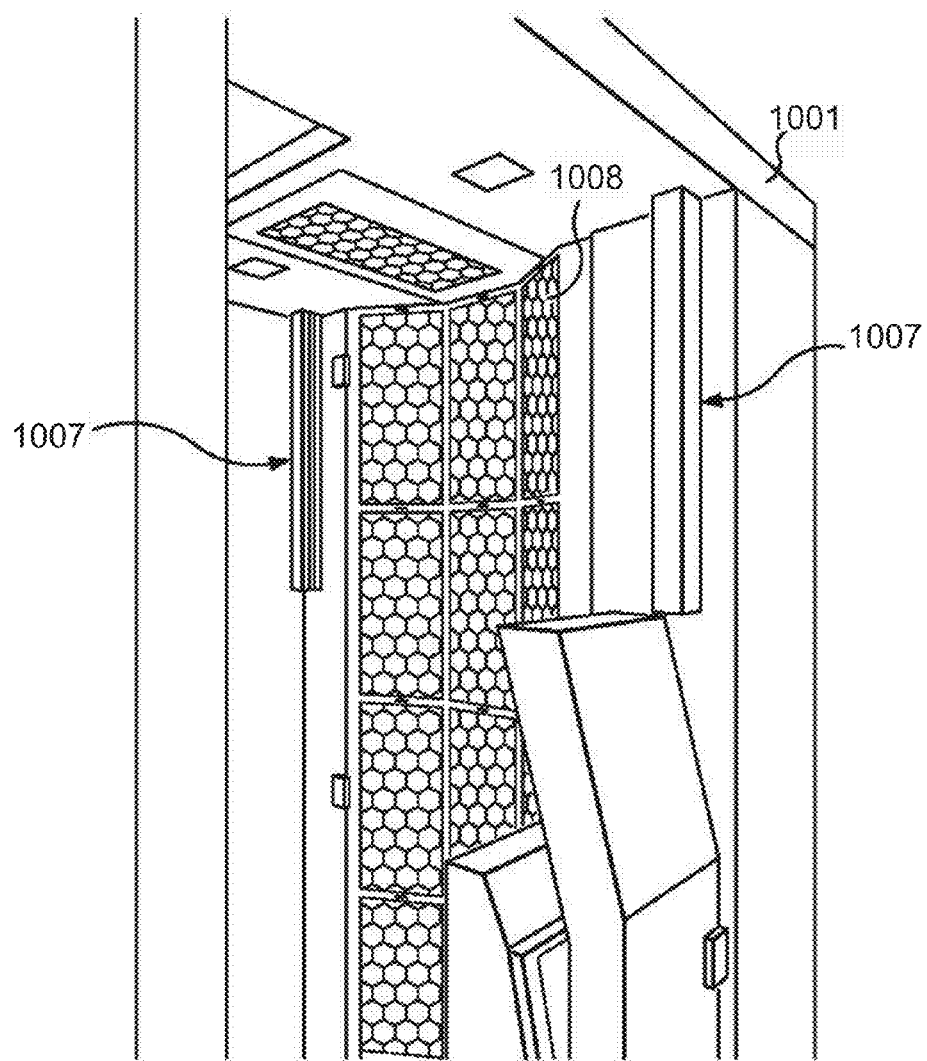
FIG. 10 illustrates a depiction of a portion of an preferred exemplary embodiment of the present invention, drawing the reader's attention to portions of an exemplary automatic height sensing device.

The height sensor (1007) is generally depicted in FIG. 10 (1000). In this preferred exemplary embodiment, the height sensor (1007) is a multi-beam photosensor device having emitter/receiver pairs positioned such that when a monitored subject enters the device (1001), they interrupt a certain number of beams. The height of each of the beams above the device (1001) deck is known beforehand and entered into the height sensor control circuitry. Thus, to determine the approximate height of the monitored subject merely requires that the height sensor (1007) control circuitry determine the lowest beam that is unbroken (or uninterrupted) by the monitored subject, and subtract half the distance between the lowest beam that is unbroken with the highest beam that is broken. This approximate height value may then be utilized in subsequent calculations.

Figure 11:
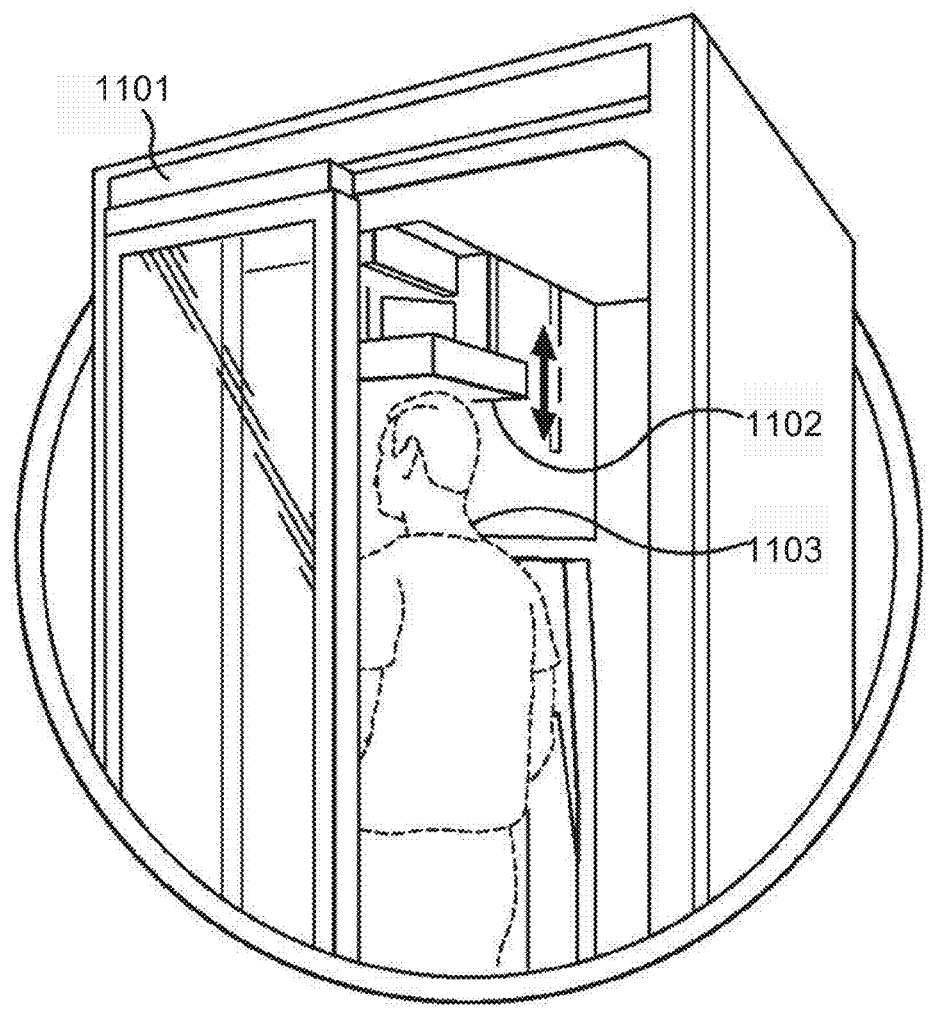
FIG. 11 illustrates a depiction of an preferred exemplary alternate means for automatically determining the height of a monitored subject (radiation worker)

FIG. 11 (1100) depicts an alternate means for detecting the height of a monitored subject. In this embodiment, the height detector (1102) is a moveable radiation detector within the device (1101) that is positioned vertically such that it physically contacts the monitored subject's head (1103) or rests slightly above. The device (1101) then automatically determines the height of the monitored subject based upon the position of the height detector (1102) relative to the floor or overhead of the device (1101). Movement of the height detector (1102) may be through manual or automatic means.

In other embodiments, the height sensor array may utilize the same types of reflective sensing devices as mentioned for the thickness sensor. For example, an ultrasonic sensing device may rely on the time-in-flight method, or an infrared sensing device may rely on reflectivity. Again, one of ordinary skill in the art will understand and appreciate that the operational theory and control design of these and other similar height determination means is well known in the industry and does not serve to limit the scope of the claims herein.

Radiation Detector Array Arrangement (1200)

Figure 12:
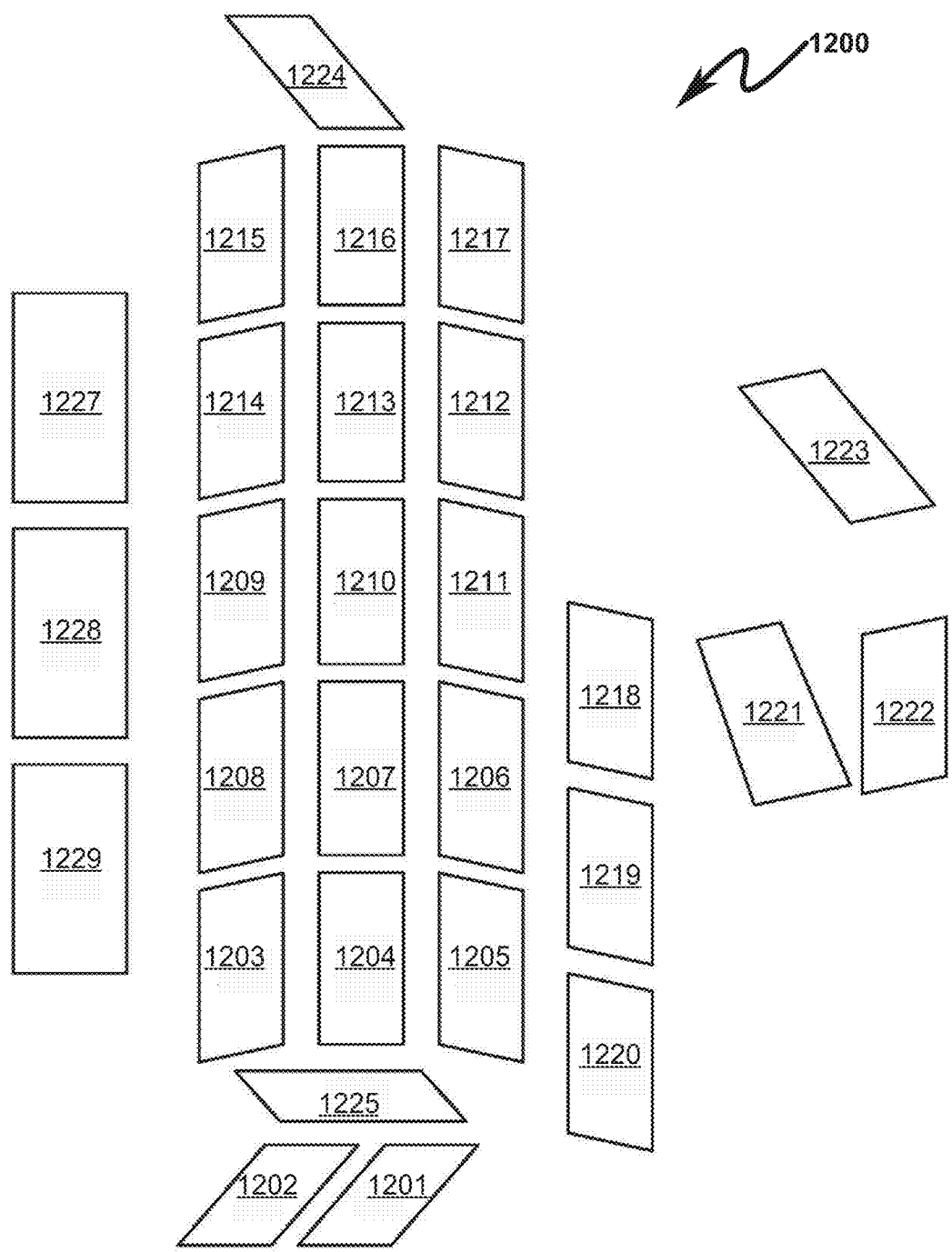
FIG. 12 illustrates a depiction of an exemplary ionizing radiation sensor array arrangement as utilized in a preferred exemplary system embodiment of the present invention.

FIG. 12 (1200) depicts a preferred exemplary ionizing radiation sensor array arrangement as utilized by a preferred embodiment of the present invention. In this preferred exemplary embodiment, the detector array consists of a combination of well-known alpha/beta (gas), and gamma (scintillation) detectors. The gamma detector panels (1227, 1228, 1229) may be physically located behind the alpha/beta detectors (1201)-(1225) within the device (0901), but are shown in the depiction alongside the alpha/beta detector array for clarity.

In another preferred embodiment, the entire detector array (1201)-(1225) consists of panels sensitive to beta and gamma radiations. Relevant gamma detectors for this embodiment are (1203)-(1217). One of ordinary skill in the art will understand and appreciate that the operational theory and detector circuitry design for utilization of these detectors is well known in the industry and does not serve to limit the scope of the claims herein.

In this embodiment, a computing device accepts inputs from the detector device (1201)-(1229) control circuitry to accept detection events. The computing device also accepts inputs from the aforementioned height and thickness sensors, and utilizes the signals provided by each in subsequent computations using the net count rate (NCR) as it relates to the self-shielding factor and corrected net count rate (CNR). A graphical user interface (GUI) is also provided to assist the operator in running utilities including configuration, calibration, and monitoring routines comprising performance of the method and program steps described herein. Although the embodiment utilizes a single computer device, multiple such devices may be utilized in other embodiments to improve net count rate (NCR) processing speed or to provide operational redundancy.

Exemplary Application Context (1300)

The radiation detector array arrangements described in FIG. 12 (1200) may serve as the basis for an exemplary system/method application context as generally illustrated in FIG. 13 (1300), wherein the monitored subject (1301) is placed within a contamination monitoring system comprising the radiation detection array (1311) used to detect monitored subject (1301) contamination in conjunction with monitored subject interface (MSI) (1310) comprising the radiation detector array interface (1317) and height detector (1318) and thickness detector (1319). As with previously described embodiments, a computer control unit (1302) executing computer codes retrieved from a computer readable medium (1313) is used to control the data collection and provide a graphical user/alarm interface (1316) for an operator (1302) to report the results of the computation of self-shielding factors and corrected net count rates (CNR) (1315).

Method Architecture (1400)-(2100)

General Data Flow and Processing (1400)

Figure 14:
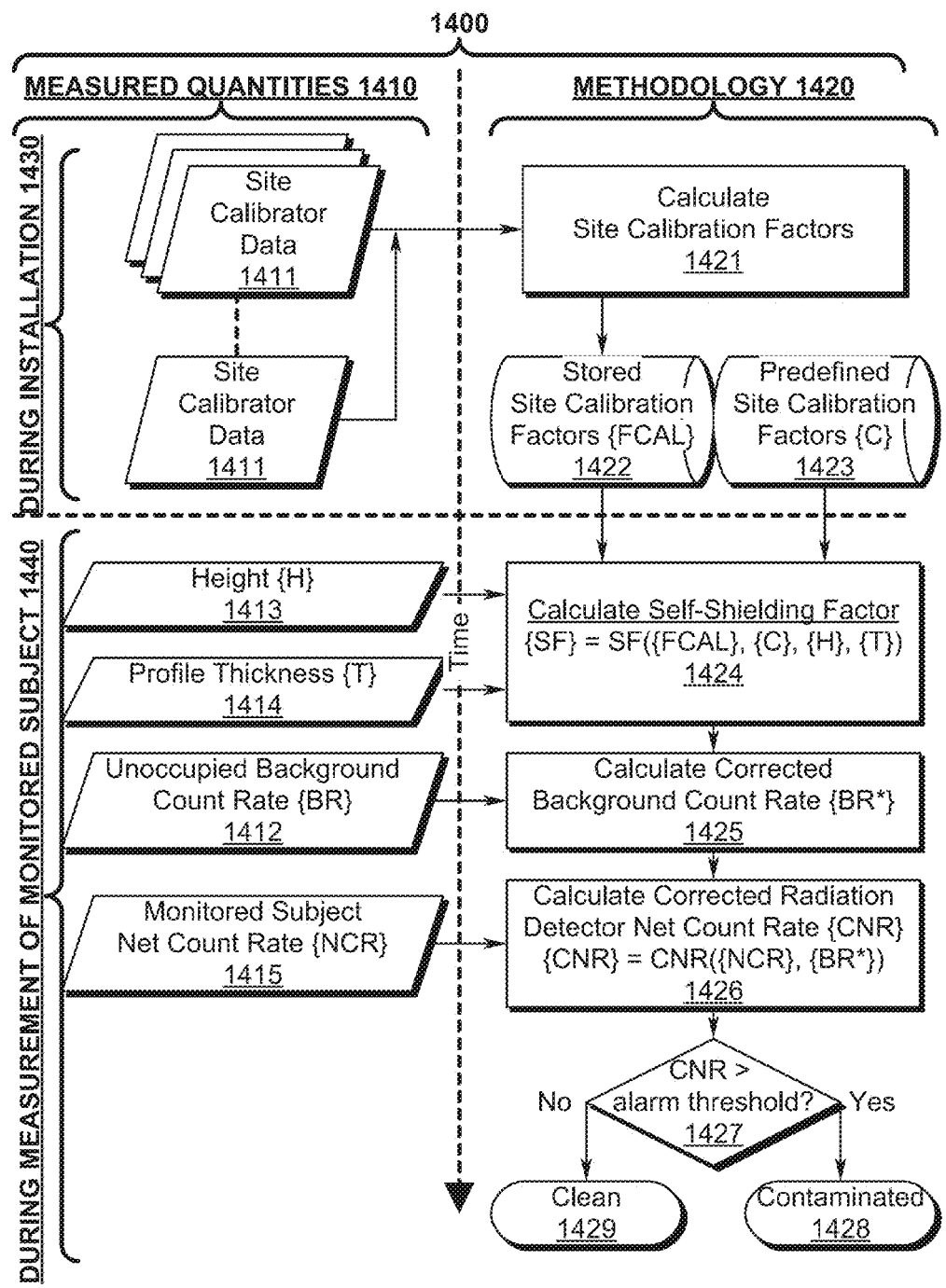
FIG. 14 illustrates a flowchart representing major portions of the method steps performed by the embodiment.

FIG. 14 (1400) depicts a method architecture flowchart indicating major data processing steps as well as data sources for those steps. As illustrated, this architectural diagram is divided into major areas involving measured quantities (1410), the methodology applied to these measured quantities (1420), temporal actions occurring during installation (1430), and temporal actions occurring during measurement of the monitored subject (1440). Within this flow diagram the major portions of the method steps performed by several preferred embodiments in calculating the monitored-subject's corrected net count rate (NCR) are illustrated. To begin, when a whole-body surface contamination monitoring device is installed it is necessary to perform an on-site calibration. This is important not only to ensure calibration has not changed from the factory, but to determine background radiation properties at the site of installation. On-site calibration consists of obtaining measurements with the device without monitored subjects standing therein, and by obtaining measurements with a plurality of monitored subjects (also called "site calibrators") known to be uncontaminated by radioactive materials.

To begin the initial on-site calibration, a large number of site calibrators (1411) are used. Site calibrators (i.e., known uncontaminated workers) representing the population of radiation workers at a particular site are especially useful in calibration because such calibrators more accurately reflect the true makeup of the worker population that will be monitored. Moreover, it is best to utilize the largest number of site calibrators (1411) as possible in order to obtain the greatest amount of calibration data from which to work. Thus, a plurality of site calibrators (1411) are monitored to obtain self-shielding on-site count data, the site calibration factors are calculated (1421) based upon the calibrator data (1411), and the site calibration factors are stored within the system in predetermined bins for subsequent calculations as the $F_{cal}$ value or factor (1422).

Site Calibrator Data (1500)

Figure 15:
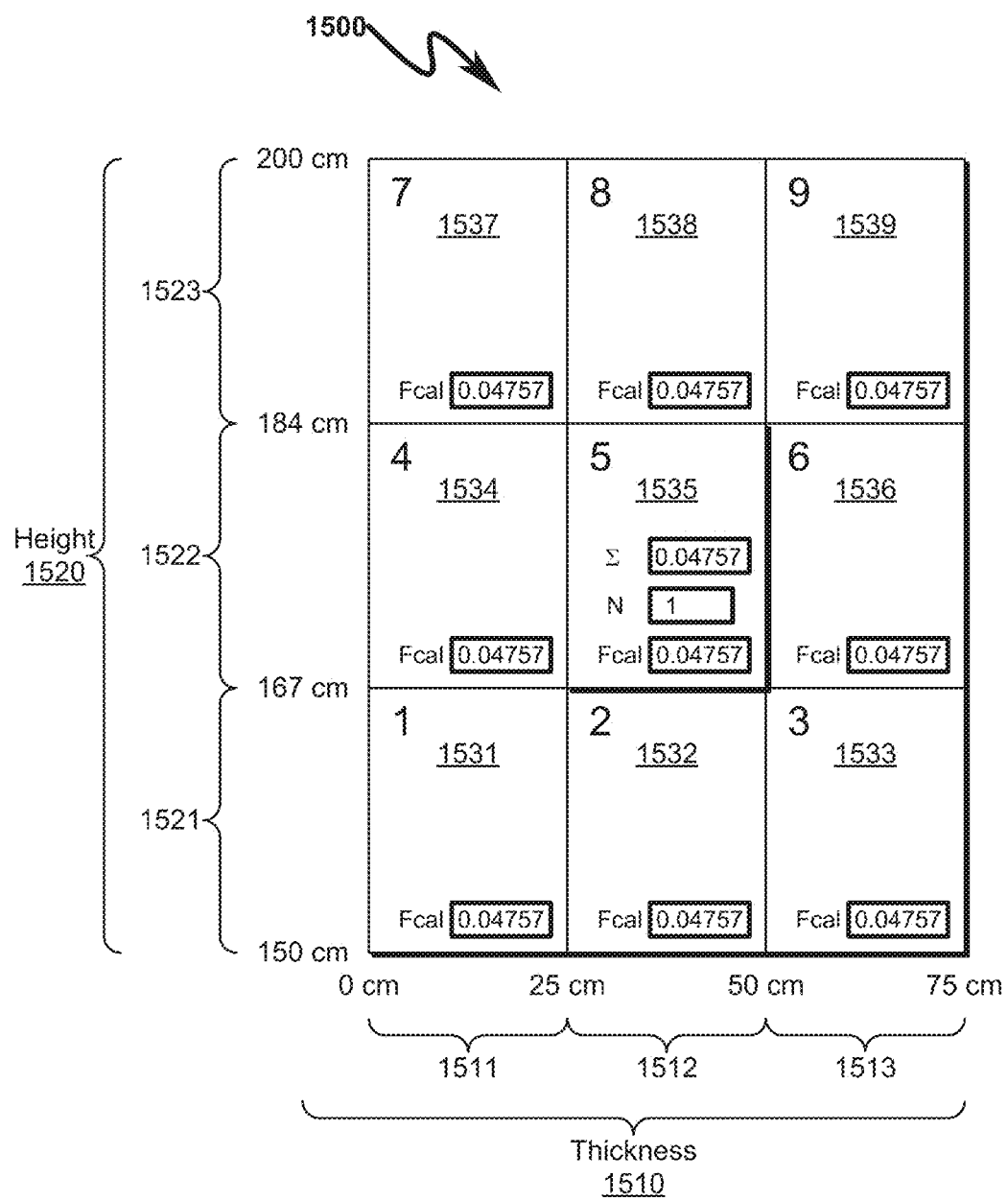
FIG. 15 illustrates anthropometric correction $F_{cal}$ tables as generated by a preferred exemplary embodiment of the present invention.

In a presently preferred exemplary embodiment, the site calibrator data (1411) as depicted in FIG. 15 (1500) is initially broken-up into nine height/thickness bins (1531, 1532, 1533, 1534, 1535, 1536, 1537, 1538, 1539). The purpose of the bins (1531, 1532, 1533, 1534, 1535, 1536, 1537, 1538, 1539) is to provide more flexibility to adjust and modify the factory parameters depending on the on-site conditions and population. From this FIG. 1500), it can be seen that the thickness data (1510) has been divided into ranges of 0-25 cm (1511), 25-50 cm (1512), and 50-75 cm (1513). Height data (1520) has been divided into ranges of 150-167 cm (1521), 167-184 cm (1522), and 184-200 cm (1523). Thus, this creates a 3×3 matrix of nine bins total. For example, using the binning process, site calibrator data obtained from workers that are from 0-25 cm thick and from 150-167 cm tall is used to populate the first bin (1531), site calibrator data obtained from workers that are from 25-50 cm thick and from 150-167 cm tall is used to populate the second bin (1532), and so on. The bin limits are adjusted to match the actual on-site worker population such that the bins are populated uniformly during calibration and operation.

As the uncontaminated site calibrators are monitored, data are collected regarding the self-shielding that occurs relative to the directly measured background count data. First, the calibrator enters the machine and assumes position 1 (anterior surface toward detector panels) and the first measurement is obtained and a $F_{cal}$ factor for position 1 is computed. Next, the calibrator turns to assume position 2 (posterior surface toward the detector panels) and the second measurement is obtained and a $F_{cal}$ factor for position 2 is computed. These factors are then retained within the appropriate bin. As additional site calibrators are measured, the additional and existing $F_{cal}$ factors are averaged for the particular bin.

In the event that there are no site calibrators for one or more bins, empty bins (1531, 1532, 1533, 1534, 1536, 1537, 1538, 1539) receive a global average $F_{cal}$ factor. Next, empty bins with populated neighboring bins (populated by actual site calibrator data) are averaged together and the resulting average is placed within the empty bin. For example, in a presently preferred exemplary embodiment, if no site calibrator data is available to populate the first bin (1531), the first bin (1531) receives the global average $F_{cal}$ factor. Next, this global $F_{cal}$ factor is averaged with the $F_{cal}$ factor from neighboring bin 2 (1532) and bin 4 (1534), and not bin 5 (1535). This new average $F_{cal}$ factor is then retained within bin 1 (1531) for subsequent measurements. In another embodiment, the diagonal bin (bin 5 (1535)) is also averaged as a contributing neighbor. Again, the present embodiment utilizes an $F_{cal}$ factor for position 1 and an $F_{cal}$ factor for position 2 within each bin, whereas in another embodiment a single $F_{cal}$ factor might be used for both positions. It should be noted in the example of FIG. 15 (1500) that the $F_{cal}$ factors are all identical because only a single calibrator has been measured.

The equation for calculating the $F_{cal}$ factor appears below as Equation (1):

$$F_{cal} = \frac{1 - SSF_{measured}}{1 - F_{att}(1 - \beta \times e^{-a \times t})} \quad (1)$$

As shown, the $F_{cal}$ factor depends on the attenuation factor ($F_{att}$) and the measured self-shielding factor ($SSF_{measured}$) for the site calibrators as well as certain predefined factory calibration factors. The measured self-shielding factor ($SSF_{measured}$) considers only the measured count rate and the background count rate ($R_B$), and appears as below in Equation (2):

$$SSF_{measured} = \frac{R_m}{R_B} \quad (2)$$

The measured count rate ($R_m$) is the count rate measured with the site calibrator in the contamination monitoring device (0210).

Factory Calibration Data (1600)-(1900)

Referring again to FIG. 14 (1400), another important part of the calibration process is the factory calibration data (C factors) (1423) that are predefined based upon known and previously measured (empirical value) characteristics of the detectors that are utilized within the device, as well as the control circuitry, geometry of the array, relative location of the detector panels, and the like. The predefined factory calibration factors (1423) for the present embodiment are obtained empirically based upon a large data set of uncontaminated calibrators measured during development of the system. One of ordinary skill in the art will understand and appreciate that the actual factory calibration factors are dependent upon the physical hardware and will vary from implementation to implementation, and will know how to obtain such factors for the given system hardware implementation.

Figure 16:
FIG. 16 illustrates exemplary default gamma detector values for positions 1 and 2.
Figure 18:
FIG. 18 illustrates exemplary anthropometric correction values and their associated position/zone affiliations.
Figure 19:
FIG. 19 illustrates exemplary anthropometric correction values and their associated position/zone affiliations.

As can be seen in the tables reproduced in FIG. 16 (1600)-FIG. 19 (1900), the calibration factors (1423) are represented by β, a, b, c, d, and $h_o$ for specific zones. Each zone may consist of a single numbered detector from the overall array as depicted in FIG. 12 (1200), or may consist of a plurality of neighboring detectors. For example, Zone 73 on the tables illustrated in FIG. 17 (1700) and FIG. 19 (1900) may represent a combination of several neighboring detectors. By combining detectors, it is possible to increase the sensitivity of a measurement due to the effectively larger scintillation area provided.

The equation for calculating the attenuation factor ($F_{att}$) is shown below as Equation (3):

$$F_{att} = b \times t + c \times t \times (h - h_0) + d \times (h - h_0) \quad (3)$$

As shown, $F_{att}$ utilizes the various factory calibration factors illustrated in the exemplary tables shown in FIG. 16 (1600)-FIG. 19 (1900). This attenuation factor ($F_{att}$) is used in subsequent shielding factor calculations.

Turning again to the flow diagram of FIG. 14, the stored site calibration factors (1422) and predefined calibration factors (1423) have been obtained as previously described. Next, before a monitored subject enters the monitoring device for measurement, the unoccupied background count rate (factor BR) (1412) is obtained. A monitored subject then enters the monitoring device and the monitored subject's height (factor H) (1413) and thickness (factor T) (1414) values are obtained in a manner as previously described. The height (H) (1413) and thickness (T) (1414) values are then utilized by the computing device to calculate the self-shielding factor (SF) (1424), which is a factor of $F_{cal}$, C, H, and T as shown below in Equation (4) and Equation (5):

$$SF_{P1} = 1 - w \times F_{cal(P1)} \times F_{att}(1 - \beta \times e^{-a \times t}) \quad (4)$$

$$SF_{P2} = 1 - w \times F_{cal(P2)} \times F_{att}(1 - \beta \times e^{-a \times t}) \quad (5)$$

Equation (4) reflects the calculation with the monitored subject in position 1 within the monitoring device while Equation (5) reflects the calculation with the monitored subject in position 2. The attenuation factor is position independent given that it is based on factory calibration data that is determined by the hardware characteristics. The "w" variable is a monitored subject defined weighting variable that allows the monitoring device operator to alter the shielding factors globally, with a single value, with a range typically between 0 and 1. This "w" variable is also considered part of the calibration factors, C (1423).

Sum Zones (2000)

It is also possible to derive a sum zone self-shielding factor by combining neighboring self-shielding factors into an average. This practice is reflected by the equation in Equation (6) below:

$$SF_i = \frac{R^i}{R_b^i} \qquad (6)$$
$$= \frac{\sum (SF_i \times R_b^i)}{\sum R_b^i}$$

As shown, the sum zone self-shielding factor $SF_i$ is a factor of the corrected count rate divided by the measured background count rate ($R_b^i$). For example, the sum zone self-shielding factor for a zone that includes detectors 27 and 28 would be calculated as shown in Equation (7) below:

$$SF_{27+28} = \frac{SSF_{27} \times R_b^{27} + SSF_{28} \times R_b^{28}}{R_b^{27} + R_b^{28}} \qquad (7)$$

Other examples of sum zone self-shielding factor calculations may involve additional elements as illustrated by the following equations:

$$SF_{28+29} = \frac{SSF_{28} \times R_b^{28} + SSF_{29} \times R_b^{29}}{R_b^{28} + R_b^{29}} \qquad (8)$$

$$SF_{27+28+29} = \frac{SSF_{27} \times R_b^{27} + SSF_{28} \times R_b^{28} + SSF_{29} \times R_b^{29}}{R_b^{27} + R_b^{28} + R_b^{29}}$$

Additional detector panels may be added to the sum zone as desired, which increases the overall sensitivity of the resultant sum zone detector as illustrated by the above equations. An exemplary report of self-shielding factors as calculated using these equations for individual and sum zone areas is generally illustrated in FIG. 20 (2000).

Calculation of Corrected Net Count Rate (CNR)

Once the desired self-shielding factor is calculated, this value is combined with the measured background count rate (1412) to compute a corrected background count rate (BR*) (1425). The monitored subject is then monitored to obtain a subject net count rate (NCR) (1415), which is then combined with the corrected background count rate (1425) to calculate a corrected net count rate (CNR) (1426), which reflects the actual contamination present on the monitored subject. If the corrected net count rate (CNR) is above a preset alarm threshold (1427), the monitored subject is considered contaminated (1428) and an alarm is registered. However, if the corrected net count rate (CNR) is not above the alarm threshold trip point, the monitored subject is considered clean (1429) and no alarm is registered.

Contamination Check Results Printout (2100)

Figure 21:
FIG. 21 illustrates an exemplary contamination monitoring report printout.

A Contamination Check Results report file may optionally be created automatically after every contamination monitoring cycle as is generally illustrated in FIG. 21 (2100), including both positions for 2-Step monitors, during normal operation (occupant check), detector/zone contamination checks (contaminated results only), and alarm tests. The Contamination Check Results report may provide the raw data used in making a "Clean" or "Contaminated" decision, including detector counts and alarm trip points for every detection zone, including sum zones (pairs, triplets, quads and "All" as applicable). This report may be used to facilitate a retrospective audit of "Clean" and "Contaminated" decisions.

If Extended Counting Time was used in making the clean/contaminated decision, then a Pre-Extend Results file containing the results for the initial counting period may also be created.

Following a user-contaminated decision, the contamination monitor may also perform a Detector Contamination Check. A Contamination Detector Check Results report may be created if the contamination monitor result is "Contaminated".

All Contamination Check Results files may optionally be automatically transferred to the central history computer or the mapped network drive if the system is as such.

Alarm Settings and Alarm Trip Point Strategy (2200, 2300)

The present invention may incorporate a monitoring algorithm using an optimization strategy for the selection of alarm set points and counting times. Each time the contamination monitor is used it may calculate the minimum counting time required to provide an accurate decision for monitored subjects who have little or no contamination and for occupants who are clearly contaminated. For those rare cases when monitored subject has contamination close to the alarm set point, an extended counting time may be required to resolve the clean/contaminated decision.

The main consideration in determining the optimum counting time is the potential for error caused by statistical fluctuations in the measured count rates. Appropriate calculations may be performed to obtain accurate clean/contaminated decisions within application specific (or user defined) reliability parameters.

The corrected net count rate (CNR) for a monitored subject (occupant) is obtained by subtracting the current effective background average from the measured gross count rate:

$$CNR = GrossRate - (BackgroundRate \times SelfShieldFactor) \qquad (9)$$
$$= R_{SB} - (R_B \times SSF)$$

Figure 22:
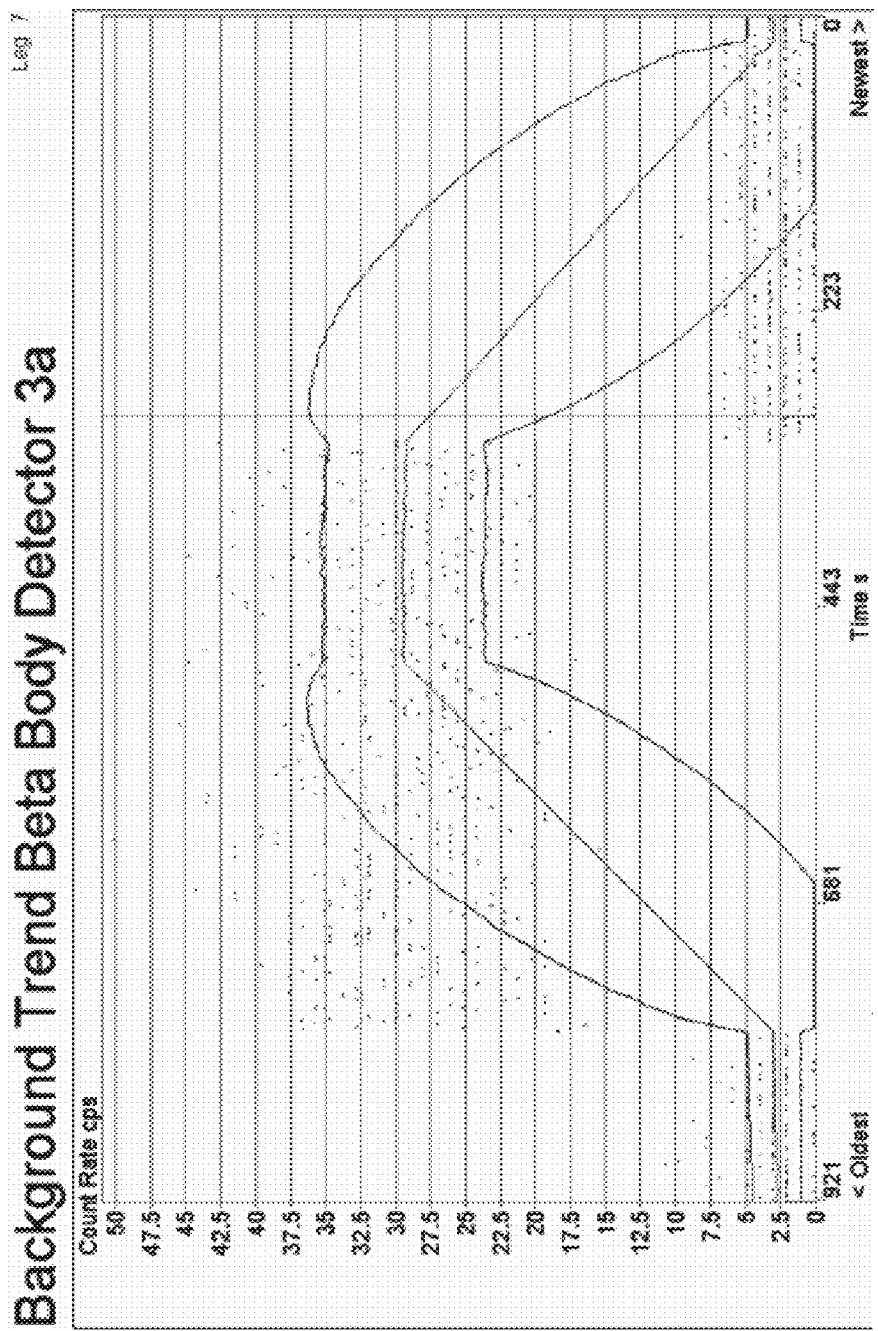
FIG. 22 illustrates an exemplary background radiation trend graph depicting background radiation changing over time.

The greatest component of statistical error is usually in the gross count rate due to the relatively short counting time. The error in the background average rate is usually less significant due to the longer averaging period. However, this might not be the case in unusually high background conditions or if the background averaging period is short as in following a step change in background. This phenomenon is generally illustrated by the background radiation curves depicted in FIG. 22 (2200). The present invention may consider the statistical error in the background average during alarm set point and counting time calculations to adjust for these factors.

Alarm Trip Points

The Used Trip Point (UTP) is the value that is compared with the compensated net count rate (CNR) to make the Clean/Contaminated decision. It can be the Lowest Level Of Detection (LLD), the Contaminated Trip Point (CTP), or the Alarm Trip Point (ATP), depending on the circumstances.

The Lowest Level of Detection (LLD) is the minimum count rate above background that will not trigger a false alarm due to statistical fluctuations. It corrects for the statistical uncertainty in the background rate. This relationship is shown in below.

$$LLD(cps) = K_\alpha \sqrt{\frac{R_b(cps)}{T_m(s)} + \left[\frac{R_b(cps)}{T_b(s)}\right]} \ldots \quad (10)$$

where $R_b$ is the effective average background count rate (for the individual zone), i.e. the average background count rate $R_B$ multiplied by the Self Shield Factor, $T_m$ is the monitoring time and $T_b$ is the time over which the background count rate is averaged (Background Average Period default is typically 300 s). The Self Shield Factor is described elsewhere herein. The term $K_\alpha$ is a statistical term related to the false alarm rate.

The Alarm Level Set point (ALS) is the release level specified by the facility at which the unit is monitoring. This is given by:

$$ALS(cps) = \text{AlarmActivity}(Bq) \times \text{Efficiency}(cps/Bq) \ldots \quad (11)$$

where AlarmActivity(Bq) is the Alarm Activity (i.e. the facility release limit) and Efficiency is the zone efficiency.

The Contaminated Trip Point (CTP) is the count rate above background at which the detection zone is considered to be definitely measuring contamination in excess of the Alarm Activity (release limit), even allowing for statistical counting error. The CTP is calculated as follows:

$$CTP(cps) = ALS(cps) + K_{\beta 1} \sqrt{\frac{ALS(cps) + R_b(cps)}{T_m(s)} + \left[\frac{R_b(cps)}{T_b(s)}\right]} \quad (12)$$

The difference between CTP and ALS represents the statistical error in ALS and in the background average $R_b$. The term $K_{\beta 1}$ is a statistical term related to the confidence of alarm.

The Alarm Trip Point (ATP) is the count rate above background at which the detection zone is considered to be possibly measuring contamination in excess of the Alarm Activity (release limit). Conversely, a count rate below the ATP is considered definitely clean, even allowing for statistical counting error. The ATP is calculated as follows:

$$ATP(cps) = ALS(cps) - K_{\beta 2} \sqrt{\frac{ALS(cps) + R_b(cps)}{T_m(s)} + \left[\frac{R_b(cps)}{T_b(s)}\right]} \quad (13)$$

The ATP is the Alarm Level Set point (ALS) minus the statistical error in the ALS and background average values. Thus the ATP is the alarm level that results in reliably detecting contamination at exactly the level for which the facility is monitoring, however readings between ATP and CTP represent potentially false contaminated decisions.

In most cases, the Used Trip Point (UTP) is the higher of LLD and ATP. This can result in false "Contaminated" results when the count rate is between the ATP and the CTP. However there are two important exceptions that serve to postpone or reverse a "Contaminated" result if the net count rate is between the ATP ("potentially contaminated") and the CTP ("definitely contaminated") levels. These exceptions may occur if additional processing is enabled (Extend Count If Contaminated) and when counting feet.

When Extend Count If Contaminated is enabled, then the UTP is the higher of LLD and CTP. A net rate between ATP and CTP will extend the count time by a user defined value. Following the extended count, the UTP reverts to the higher of LLD and ATP calculated for the total (normal plus extended) counting time, which is higher than the corresponding values at the end of the initial count time, because the error term is smaller. Note that if any zone(s) registers definitely contaminated (above the CTP) then the unit will alarm at the end of the initial (i.e. not extended) counting time and the UTP for the remaining zones reverts to the higher of LLD and ATP.

When counting feet (or other selected items associated with the monitored subject) in two steps and the occupant is in the first position (Monitor Position 1) then a "Contaminated" decision for a foot detection zone, if in doubt, could be postponed until the end of the second counting period; hence the UTP for the foot detectors is the higher of LLD and CTP. In the second position (Monitor Position 2) the UTP reverts to the higher of LLD and ATP calculated for the total (Position 1 plus Position 2) counting time, which is higher than the corresponding values at the end of the first count time, because the error term is smaller. This permits the use of a shorter counting time for foot zones than would otherwise be possible. If it happens that a non-foot zone is controlling the count time such that the count time required for each foot zone is less than the count time being used, then the "Count Feet in Two Steps" is not used in Position 1. However in Position 2 the counts in both positions are still combined when computing the measured count rate.

The diagram in FIG. 23 (2300) illustrates the relationship between CTP, ATP, ALS, LLD and average background count rate $R_b$. Notice how the spread between ATP, ALS and CTP decreases when the Count Time is extended.

Counting Time Strategy

The minimum usable counting time that will reliably detect true alarm conditions while not false alarming due to background fluctuations occurs when LLD=ATP (see FIG. 23 (2300)). Solving for the count time $T_m$ results in this case results in the following count time equation:

$$T_m(s) = \frac{1}{2}\left[\sqrt{X_0^2 - 4Y_0} - X_0\right] \quad (14)$$

where $$X_0 = \frac{2 \times X_1 \times Y_1 - 4 \times ALS^2 \times K_\beta^2 \times (ALS + R_b)}{W_1}$$

$$Y_0 = \frac{X_1^2}{W_1}$$

$$X_1 = R_b \times (K_\alpha^2 - K_\beta^2) - ALS \times K_\beta^2$$

$$Y_1 = \frac{R_b}{T_b} \times (K_\alpha^2 - K_\beta^2) - ALS^2$$

$$W_1 = Y_1^2 - 4 \times ALS^2 \times K_\beta^2 \times \frac{R_b}{T_b}$$

Note that the equation above is solved for every detection zone (singles, pairs, triplets, quads and all and quads) in the system. The zone that requires the longest counting time (having allowed for counting feet in two steps, if enabled)

becomes the controlling zone for determining the system counting time. The minimum monitoring time ($T_m$) may be reported as 0.01 s even if the calculated value is less than 0.01 s. The actual counting time in effect may be the time required by the controlling zone, rounded up to the next whole integer of seconds.

If the background is high it may not be possible to equate LLD and ATP due to counting time restrictions. A the Maximum Monitor Time user parameter may be used such that if this parameter is less than the count time needed to meet the alarm accuracy (that is, less than then the LLD may be used for the trip point in place of the ATP. This substitution may prevent abnormal false alarm rates at the expense of decreased alarm sensitivity. A status screen indicator may be presented in this instance to indicate that the unit is operating with reduced alarm sensitivity and that the monitor is more likely to indicate a Clean result for contamination close to the alarm release limit. There may only be 1 or 2 detection zones at the LLD, while the remaining zones may be still at the ATP, i.e. providing full alarm sensitivity in those regions.

$$T_m(s) = \left[ \frac{K_\alpha \times \sqrt{R_b(cps)} + K_\beta \times \sqrt{ALS(cps) + R_b(cps)}}{ALS(cps)} \right]^2 \quad (15)$$

The equation above calculates a count time without the $T_b$ term and may be used to check the effect of the Background Average Period ($T_b$) term.

Background FALSE Alarm Rate (FAR)

The $K\alpha$ (K Alpha) term is a statistical term related to the false alarm rate (FAR) due to background radiation. The K Alpha term determines the Lowest Level of Detection (LLD) for the contamination monitor given the acceptable false alarm rate. It is the system false alarm rate that is important, as opposed to that for individual detection zones. The monitoring time for the system is controlled by the "worst-case" zone and is dependent on the background count rate, the zone efficiency, etc. As the worst-case zone sets the counting time, all other zones are forced to count longer than needed and therefore have improved statistical data for making a decision, i.e. they will have a lower FAR.

In many exemplary invention embodiments the foot detectors are frequently the "worst-case" detectors, since they have lower efficiency. Other detectors may count longer than they need to, and thus have a reduced probability of false alarming.

The system FAR is the sum of the FAR for each individual detection zone. If each zone had identical conditions and independent count rates (which is not strictly true for sum zones) and was set to an individual zone FAR of 1:370 (i.e. K Alpha=3.0), then the system FAR would be the sum of the individual probabilities. Exemplary false alarm rates per detector as they relate to K Alpha are presented in the following table:

| False Alarm Rate Per Detector | K Alpha |
|---|---|
| 1:1 | 0.0 |
| 1:2 | 0.5 |
| 1:3 | 1.0 |
| 1:7 | 1.5 |
| 1:22 | 2.0 |
| 1:81 | 2.5 |
| 1:370 | 3.0 |
| 1:2149 | 3.5 |
| 1:15787 | 4.0 |

Confidence of Alarm

The K Beta terms determine the confidence that the system will alarm for a true "contaminated" condition. This is the statistical confidence that the alarm trip level will be exceeded by the net count rate for the detection zone and is based on a statistical calculation for a "2-tail" Poisson distribution. The default K Beta is typically set to 2.00 (95.45%). An exemplary table correlating alarm confidence to the K Beta term is provided below:

| Alarm Confidence (2 tail) in % | K Beta |
|---|---|
| 75 | 1.151 |
| 80 | 1.282 |
| 85 | 1.440 |
| 90 | 1.645 |
| 95 | 1.960 |
| 96 | 2.054 |
| 97 | 2.170 |
| 98 | 2.326 |
| 99 | 2.575 |

Detailed Method Summary (2400)

As generally illustrated in FIG. 24 (2400), a detailed method summary of the present invention method as applied to a surface contamination monitoring method operating under control of a computerized computing device comprises the steps of:

(1) reading unoccupied background radiation count rates (2401);

(2) calculating corrected background count rates per individual detection zone (2402);

(3) reading the monitored subject height from a sensor (2403);

(4) reading the monitored subject thicknesses from one or more sensors (2404);

(5) calculating Fcal factors for a monitored subject first position (2405);

(6) calculating Fcal factors for a monitored subject second position (2406);

(7) calculating self-shielding factors for a monitored subject first position (2407);

(8) calculating self-shielding factors for a monitored subject second position (2408);

(9) calculating a corrected radiation detector net count rate (CNR) (2409);

(10) determining if the CNR exceeds an alarm threshold (2410);

(11) if the CNR exceeds an alarm threshold, triggering a CONTAMINATION ALARM (2411); and

(12) if the CNR does not exceed the alarm threshold, issuing a NOT CONTAMINATED status (2412);

wherein the CNR comprises a self-shielding correction factor;

the self-shielding correction factor comprises a monitored subject height value and a monitored subject thickness value;

the height value represents a physical characteristic of the monitored subject; and the thickness value represents a physical characteristic of the monitored subject.

One skilled in the art will recognize that these method steps may be skipped, augmented, and/or rearranged without limiting the teachings of the present invention. This general method summary may be augmented by the various elements described herein to produce a wide variety of invention embodiments consistent with this overall design description.

System Summary

The present invention preferred exemplary system embodiment anticipates a wide variety of variations in the basic theme of construction, but can be generalized as a surface contamination monitoring system comprising:
(c) radiation detector array; and
(d) computing device;
wherein
the radiation detector array is configured to monitor radioisotope surface-contamination of a monitored subject;
the computing device is configured to compute a corrected net count rate (CNR) based upon the net count rate (NCR) output of the radiation detector array;
the CNR comprises a self-shielding correction factor;
the self-shielding correction factor comprises a height value and a thickness value;
the height value represents a physical characteristic of the monitored subject; and
the thickness value represents a physical characteristic of the monitored subject.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a surface contamination monitoring method operating under control of a computerized computing device, the method comprising the steps of:
(1) accepting outputs from a radiation detector array configured to monitor radioisotope surface-contamination of a monitored subject;
(2) computing a corrected net count rate (CNR) based upon the net count rate (NCR) output of the radiation detector array;
(3) determining if the CNR exceeds a predetermined alarm threshold;
(4) if the alarm threshold has been exceeded, signaling a monitored subject contamination alarm and proceeding to step (6);
(5) otherwise signaling a monitored subject clean status; and
(6) terminating the contamination monitoring method;
wherein
the CNR comprises a self-shielding correction factor;
the self-shielding correction factor comprises a monitored subject height value and a monitored subject thickness value;
the height value represents a physical characteristic of the monitored subject; and
the thickness value represents a physical characteristic of the monitored subject.

One skilled in the art will recognize that these method steps may be skipped, augmented, and/or rearranged without limiting the teachings of the present invention. This general method summary may be augmented by the various elements described herein to produce a wide variety of invention embodiments consistent with this overall design description.

Monitored Subject Weight

The present invention anticipates that the monitored subject may be weighed (either manually or by automatic means) in some preferred invention embodiments to permit the thickness/height measurements performed herein to accommodate accurate density distributions within the body of the measured subject and therefore permit a more accurate corrected net count rate (CNR) determination to be performed.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the radiation detector array comprises a plurality of gamma radiation detectors.

An embodiment wherein the radiation detector array is located within a vertical panel that encloses the area in which the monitored subject stands.

An embodiment wherein the height value is automatically determined using a sensor.

An embodiment wherein the thickness value is automatically determined using a sensor.

An embodiment wherein the height value is automatically determined using a plurality of sensors and the thickness value is automatically determined using a plurality of sensors.

An embodiment wherein the height value is determined based on automatic measurements received from a sensor selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

An embodiment wherein the thickness value is determined based on automatic measurements received from a sensor selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

An embodiment wherein a plurality of thickness values is utilized to compute the self-shielding correction factor specific to a given section of the radiation detector array proximate to the area of the monitored subject associated with the thickness values.

An embodiment wherein:
(a) a plurality of thickness values are determined based on automatic measurements from a plurality of sensor devices such that the plurality of thickness values represents the thicknesses of different areas of the monitored subject; and
(b) the sensor devices are selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

An embodiment wherein a plurality of thickness values is utilized to compute the self-shielding correction factor specific to a given section of the detector array proximate to the area of the monitored subject associated with the thickness values.

An embodiment wherein a plurality of radiation detectors within the radiation detector array are combined to create a sum zone self-shielding factor by combining neighboring self-shielding factors into an average.

An embodiment wherein the methodology of the self-shielding correction calculation using Equations (1)-(8) contained herein have a different set of coefficients or calibration factors and a different empirical relationship to the measured values of detector count rates, background rates, heights, and/or thicknesses. Thus, the present invention anticipates that the calculation of self-shielding correction factors is only exemplary and may encompass specific algorithms and/or calculations not explicitly defined herein. These invention embodiments may vary widely based on test data and empirical formulas that are application specific.

An embodiment wherein the methodology of determining the alarm settings and alarm trip point strategy is based on Bayesian statistical principles for the assessment of detection capabilities and confidence intervals such as those outlined in the international standard ISO-11929:2010. The calculations presented herein are only exemplary and are based on classical statistical methods, subject to application specific variations in implementation.

One skilled in the art will recognize that other embodiments are possible based on combinations of elements taught within the above invention description and cited embodiments.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A surface contamination monitoring system/method configured to correct the detected the radioactive net count rate (NCR) value of a whole-body surface contamination monitoring device based on monitored subject height and thickness has been disclosed. The system includes a height detection means for determining the height of a monitored subject and a thickness detection means for determining the thickness of at least a portion of the monitored subject. The net count rate (NCR) is corrected based on the determined height and thickness of the monitored subject as applied to site calibration factor data and self-shielding factor data to produce a corrected net count rate (CNR). If the corrected net count rate (CNR) registers above a preset alarm threshold, the monitored subject is considered contaminated and an appropriate alarm is registered.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims. Further, the recitation of method steps does not denote a particular sequence for execution of the steps. Such method steps may therefore be performed in a sequence other than that recited unless the particular claim expressly states otherwise.

What is claimed is:

1. A surface contamination monitoring system comprising:
   (a) radiation detector array; and
   (b) computing device;
   wherein
   said radiation detector array is configured to monitor radio-isotope surface-contamination of a monitored subject;
   said computing device is configured to compute a corrected net count rate (CNR) based upon the net count rate (NCR) output of said radiation detector array;
   said CNR comprises a self-shielding correction factor;
   said self-shielding correction factor comprises a height value and a thickness value;
   said height value represents a physical characteristic of said monitored subject; and
   said thickness value represents a physical characteristic of said monitored subject.

2. The surface contamination monitoring system of claim 1 wherein said radiation detector array comprises a plurality of gamma radiation detectors.

3. The surface contamination monitoring system of claim 1 wherein said radiation detector array is located within a vertical panel that encloses the area in which said monitored subject stands.

4. The surface contamination monitoring system of claim 1 wherein said height value is automatically determined using a sensor.

5. The surface contamination monitoring system of claim 1 wherein said thickness value is automatically determined using a sensor.

6. The surface contamination monitoring system of claim 1 wherein said height value is automatically determined using a plurality of sensors and said thickness value is automatically determined using a plurality of sensors.

7. The surface contamination monitoring system of claim 1 wherein said height value is determined based on automatic measurements received from a sensor selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

8. The surface contamination monitoring system of claim 1 wherein said thickness value is determined based on automatic measurements received from a sensor selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

9. The surface contamination monitoring system of claim 1 wherein a plurality of thickness values is utilized to compute the self-shielding correction factor specific to a given section of said radiation detector array proximate to the area of said monitored subject associated with said thickness values.

10. The surface contamination monitoring system of claim 1 wherein:
   (a) a plurality of thickness values are determined based on automatic measurements from a plurality of sensor devices such that said plurality of thickness values represents the thicknesses of different areas of said monitored subject; and
   (b) said sensor devices are selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

11. The surface contamination monitoring system of claim 1 wherein a plurality of radiation detectors within said radiation detector array are combined to create a sum zone self-shielding factor by combining neighboring self-shielding factors into an average.

12. A surface contamination monitoring method operating under control of a computerized computing device, said method comprising the steps of:
   (1) accepting outputs from a radiation detector array configured to monitor radioisotope surface-contamination of a monitored subject;
   (2) computing a corrected net count rate (CNR) based upon the net count rate (NCR) output of said radiation detector array;
   (3) determining if said CNR exceeds a predetermined alarm threshold;
   (4) if the alarm threshold has been exceeded, signaling a monitored subject contamination alarm and proceeding to step (6);
   (5) otherwise signaling a monitored subject clean status; and
   (6) terminating the contamination monitoring method;
   wherein
   said CNR comprises a self-shielding correction factor;
   said self-shielding correction factor comprises a monitored subject height value and a monitored subject thickness value;
   said height value represents a physical characteristic of said monitored subject; and
   said thickness value represents a physical characteristic of said monitored subject.

13. The surface contamination monitoring method of claim 12 wherein said radiation detector array comprises a plurality of gamma radiation detectors.

14. The surface contamination monitoring method of claim 12 wherein said radiation detector array is located within a vertical panel that encloses the area in which said monitored subject stands.

15. The surface contamination monitoring method of claim 12 wherein said height value is automatically determined using a sensor.

16. The surface contamination monitoring method of claim 12 wherein said thickness value is automatically determined using a sensor.

17. The surface contamination monitoring method of claim 12 wherein said height value is automatically determined using a plurality of sensors and said thickness value is automatically determined using a plurality of sensors.

18. The surface contamination monitoring method of claim 12 wherein said height value is determined based on automatic measurements received from a sensor selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

19. The surface contamination monitoring method of claim 12 wherein said thickness value is determined based on automatic measurements received from a sensor selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

20. The surface contamination monitoring method of claim 12 wherein a plurality of thickness values is utilized to compute the self-shielding correction factor specific to a given section of said radiation detector array proximate to the area of said monitored subject associated with said thickness values.

21. The surface contamination monitoring method of claim 12 wherein:
   (a) a plurality of thickness values are determined based on automatic measurements from a plurality of sensor devices such that said plurality of thickness values represents the thicknesses of different areas of said monitored subject; and
   (b) said sensor devices are selected from a group consisting of: photosensor; infrared reflectivity photosensor; time-of-flight photosensor; angular detection photosensor; multi-beam photosensor; orthogonal array photosensor; ultrasonic sensor; and mechanical contact sensor.

22. The surface contamination monitoring method of claim 12 wherein a plurality of radiation detectors within said radiation detector array are combined to create a sum zone self-shielding factor by combining neighboring self-shielding factors into an average.

23. The surface contamination monitoring method of claim 12 wherein said method steps further comprise:
   (1) accepting predefinition of a plurality of data bins, wherein each bin represents a different height range and thickness range consistent with the height and thickness values of a plurality of site calibrators; and
   (2) calculating a measured count rate for each of the on-site calibrators to obtain site calibration factor data, the site calibration factor data assigned to a data bin consistent with the height and thickness of the on-site calibrator, wherein the self-shielding factor calculation includes the site calibration factor data.

24. The surface contamination monitoring method of claim 12 wherein said method steps further comprise:
   (1) accepting predefinition of a plurality of data bins, wherein each bin represents a different height range and thickness range consistent with the height and thickness values of a plurality of site calibrators;
   (2) calculating a measured count rate for each of the on-site calibrators to obtain initial site calibration factor data, the initial site calibration factor data assigned to a data bin consistent with the height and thickness of the on-site calibrator; and (3) calculating a global average site calibration factor data for assignment to any bin not receiving initial site calibration factor data, wherein the self-shielding factor calculation includes the initial site calibration factor data and the global average site calibration factor data.

25. The surface contamination monitoring method of claim 12 wherein said method steps further comprise:
  (1) accepting predefinition of a plurality of data bins, wherein each bin represents a different height range and thickness range consistent with the height and thickness values of a plurality of site calibrators;
  (2) calculating a measured count rate for each of the on-site calibrators to obtain initial site calibration factor data, the initial site calibration factor data assigned to a data bin consistent with the height and thickness of the on-site calibrator;
  (3) calculating a global average site calibration factor data for assignment to any bin not receiving initial site calibration factor data; and
  (4) calculating a final average site calibration factor data for each bin not receiving initial site calibration factor data, wherein the final average site calibration factor data includes the global average site calibration factor data and the neighboring initial site calibration factor data, and wherein the self-shielding factor calculation includes the initial site calibration factor data and the final average site calibration factor data.

* * * * *